United States Patent
Lee et al.

(10) Patent No.: US 10,091,436 B2
(45) Date of Patent: Oct. 2, 2018

(54) ELECTRONIC DEVICE FOR PROCESSING IMAGE AND METHOD FOR CONTROLLING THE SAME

(71) Applicant: Samsung Electronics Co., Ltd., Suwon-si, Gyeonggi-do (KR)

(72) Inventors: Ki-Huk Lee, Suwon-si (KR); Parijat Prakash Prabhudesai, Bangalore (IN); Sabari Raju Shanmugam, Bangalore (IN); Jin-Hee Na, Seoul (KR); Kshitij Dwivedi, Bangalore (IN); Sanket Deshmukh, Bangalore (IN); Siddarth Reddy Malreddy, Bangalore (IN); Jong-Min Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 15/154,615

(22) Filed: May 13, 2016

(65) Prior Publication Data

US 2016/0337601 A1  Nov. 17, 2016

(30) Foreign Application Priority Data

May 13, 2015  (IN) .......................... 2428/CHE/2015
Sep. 22, 2015  (KR) ....................... 10-2015-0133683

(51) Int. Cl.
| | | |
|---|---|---|
| *H04N 5/78* | (2006.01) | |
| *H04N 5/262* | (2006.01) | |
| *H04N 13/271* | (2018.01) | |
| *G06T 7/194* | (2017.01) | |
| *G06T 7/579* | (2017.01) | |
| *G06T 7/215* | (2017.01) | |
| *H04N 13/221* | (2018.01) | |

(52) U.S. Cl.
CPC .......... *H04N 5/2621* (2013.01); *G06T 7/194* (2017.01); *G06T 7/215* (2017.01); *G06T 7/579* (2017.01); *H04N 13/221* (2018.05); *H04N 13/271* (2018.05)

(58) Field of Classification Search
None
See application file for complete search history.

(56) References Cited

U.S. PATENT DOCUMENTS

| | | |
|---|---|---|
| 2006/0087578 A1 | 4/2006 | Hong et al. |
| 2007/0269108 A1 | 11/2007 | Steinberg et al. |
| 2008/0240517 A1* | 10/2008 | Okamoto ........... G06K 9/00234 382/118 |

(Continued)

FOREIGN PATENT DOCUMENTS

KR  10-2006-0037025 A  5/2006

*Primary Examiner* — Eileen M Adams
(74) *Attorney, Agent, or Firm* — Jefferson IP Law, LLP

(57) ABSTRACT

An electronic device is provided. The electronic device includes a camera module and an image processing module. The image processing module may obtains a first image and a second image for the scene including a first object and a second object, identifies a first motion amount corresponding to the first object and a second motion amount corresponding to the second object using the first image and the second image, and applies different effects to a first image area corresponding to the first object and a second image area corresponding to the second object, at least, based on the first motion amount and the second motion amount.

19 Claims, 24 Drawing Sheets

(56) References Cited

U.S. PATENT DOCUMENTS

| | | | | |
|---|---|---|---|---|
| 2010/0194856 A1* | 8/2010 | Varekamp | .......... | H04N 13/0022 348/42 |
| 2013/0033566 A1* | 2/2013 | Sento | .................... | G03B 37/02 348/36 |
| 2013/0121537 A1* | 5/2013 | Monobe | ............. | H04N 5/23254 382/106 |
| 2013/0342735 A1 | 12/2013 | Chan et al. | | |

* cited by examiner

ELECTRONIC DEVICE FOR PROCESSING IMAGE AND METHOD FOR CONTROLLING THE SAME

CROSS-REFERENCE TO RELATED APPLICATION(S)

This application claims the benefit under 35 U.S.C. § 119(a) of an Indian patent application filed on May 13, 2015 in the Indian Patent Office and assigned Serial number IN 2428/CHE/2015, and of a Korean patent application filed on Sep. 22, 2015 in the Korean Intellectual Property Office and assigned Serial number 10-2015-0133683, the entire disclosure of each of which is hereby incorporated by reference.

TECHNICAL FIELD

The present disclosure relates to electronic devices for processing images and methods for controlling the same.

BACKGROUND

Electronic devices with camera modules (e.g., portable electronic devices) are spreading nowadays. A user may easily capture an image using an electronic device at his desired time. A recent electronic device may include camera modules respective on the front and rear part. Thus, the user may capture images of outside views using the camera module provided in the rear part of the electronic device. The user may also capture images using the camera module provided in the front part of the electronic device when he desires to take a picture of himself.

As set forth above, the user may capture images using the camera module provided in the front part of the electronic device. As the electronic device becomes slim and compact, the camera modules in the electronic device may be made relatively small. This relatively limits the functions of the camera modules in the electronic device. For example, a function requiring the lens to be driven, such as out-focusing, is difficult to perform by the camera module in the small electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device having a camera module with limited functions may also carry out various functions including out-focusing, segmentation, or generation of depth map.

In accordance with an aspect of the present disclosure, an electronic device is provided. The electronic device includes a camera module for capturing a scene and an image processing module operatively connected with the camera module, wherein the image processing module may obtain a first image and a second image for the scene including a first object and a second object, identify a first motion amount corresponding to the first object and a second motion amount corresponding to the second object using the first image and the second image, and apply different effects to a first image area corresponding to the first object and a second image area corresponding to the second object, at least, based on the first motion amount and the second motion amount. The display may display effect-applied images, or the memory may store the effect-applied images.

In accordance with another aspect of the present disclosure, an electronic device is provided. The electronic device includes a camera module capturing a scene including one object and an image processing module operatively connected with the camera module, wherein the image processing module may obtain a plurality of images for the scene, identify whether a motion amount corresponding to the object in the plurality of images meets a predetermined value, and apply a predetermined effect to an image area corresponding to the object, at least, based on a result of the identification.

Various embodiments of the present disclosure enable a small electronic device unable to adjust the camera depth to carry out various functions including out-focusing, segmentation, and generation of depth map. According to various embodiments of the present disclosure, there are provided such electronic device and method for controlling the same.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description take in conjunction with the accompanying drawings, in which.

Throughout the drawings, like reference numerals will be understood to refer to like parts, components, and structures.

DETAILED DESCRIPTION

Figure 1A:
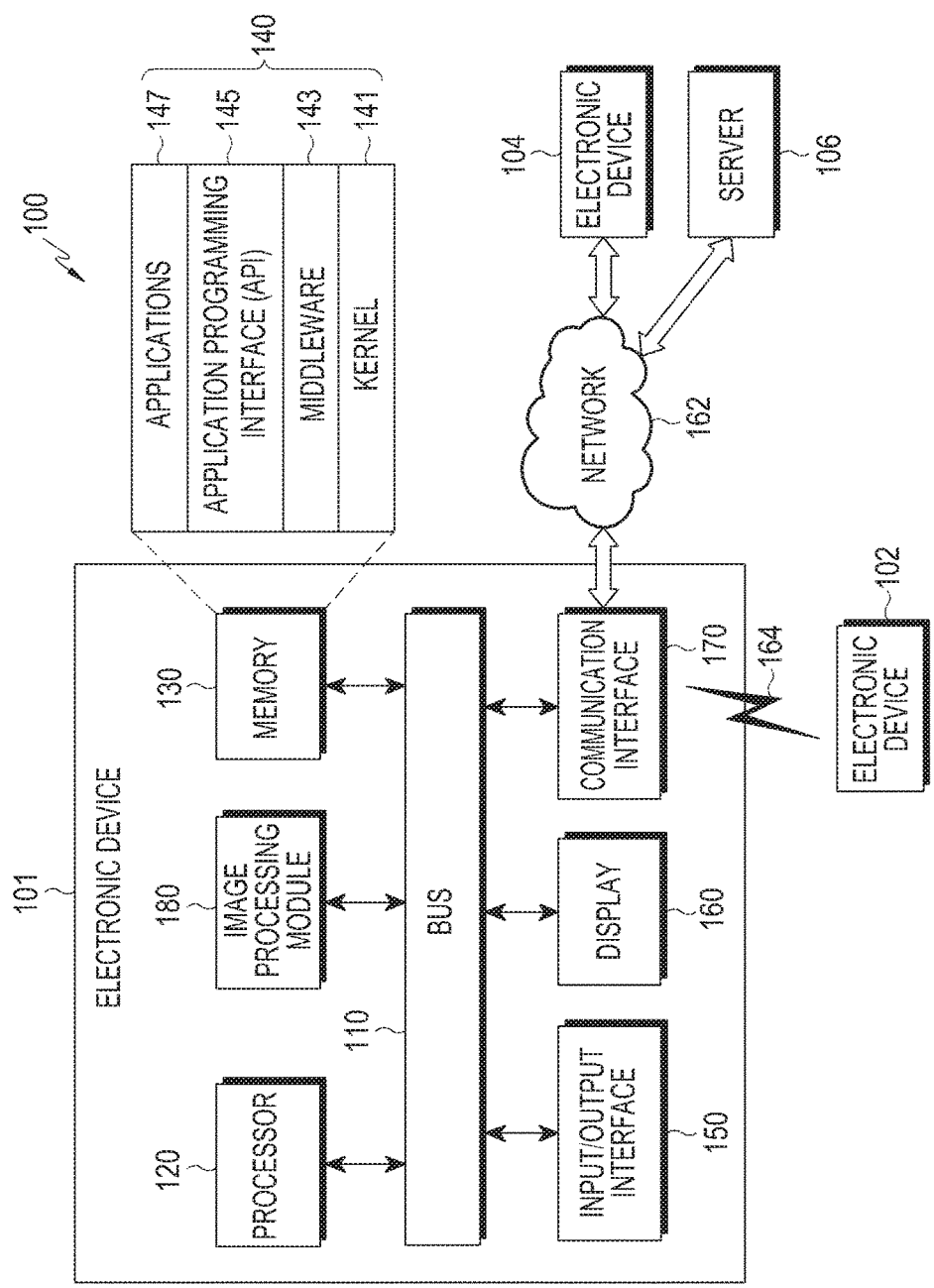
FIG. 1A is a block diagram illustrating an electronic device and a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. For example, examples of the smart home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A is a block diagram illustrating an electronic device and a network according to an embodiment of the present disclosure.

Referring to FIG. 1A, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of Wi-Fi, Bluetooth, near-field communication (NFC), or GNSS. The GNSS may include at least one of, e.g., global positioning system (GPS), global navigation satellite system (Glonass), Beidou navigation satellite system (hereinafter, "Beidou") or Galileo, or the european global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of telecommunication networks, e.g., a computer network (e.g., local area network (LAN) or wide area network (WAN)), Internet, or a telephone network.

According to an embodiment of the present disclosure, the camera module (not shown) may capture a scene. An image processing module 180 may input/output data with other hardware components via the bus 110. According to an embodiment of the present disclosure, the image processing module 180 may obtain a first image and a second image for the scene including a first object and a second object, identify a first motion amount corresponding to the first object and a second motion amount corresponding to the second object using the first image and the second image, and apply different effects to a first image area corresponding to the first object and a second image area corresponding to the second object, at least, based on the first motion amount and the second motion amount.

According to an embodiment of the present disclosure, the first motion amount may correspond to a difference between a position of the first object in the first image and a position of the first object in the second image, and the second motion amount may correspond to a difference between a position of the second object in the first image and a position of the second object in the second image.

According to an embodiment of the present disclosure, the image processing module 180 may select, as the first image and the second image, a pair of images having a difference in motion amount not less than a predetermined value from among a plurality of preview images for the scene.

According to an embodiment of the present disclosure, the image processing module 180 may compare the first image with the second image and obtains at least one of the first motion amount or the second motion amount based on a result of the comparison.

According to an embodiment of the present disclosure, the image processing module 180 may compare the first image with the second image, determine whether a difference between the first motion amount and the second motion amount meets a predetermined value, and determine the first image area and the second image area based on the determination.

According to an embodiment of the present disclosure, the image processing module 180 may separate the first object from the second object in the first image based on the first motion amount and the second motion amount.

According to an embodiment of the present disclosure, the first image area may correspond to a first depth for the scene, and the second image area correspond to a second depth for the scene.

According to an embodiment of the present disclosure, the image processing module 180 may classify the first image area based on predetermined color information, determine a difference between the first motion amount and a motion amount of an area to be classified around the first image area, when the difference meets a predetermined value, determine the area to be classified as a portion of the corresponding first image area, and when the difference does not meet the predetermined value, determine the area to be classified as not belonging to the first image area.

According to an embodiment of the present disclosure, the first object may include a figure, and the second object may include a background. The image processing module 180 may blur the background and output an image including the figure and the blurred background as an image corresponding to the scene.

According to an embodiment of the present disclosure, the first image may be obtained as the electronic device performs capturing at a first position, and the second image may be obtained as the electronic device performs capturing at a second position. The first motion amount and the second motion amount may be generated by a difference in position between the first position and the second position.

According to an embodiment of the present disclosure, the image processing module 180 may assign a first depth value to the first object and a second depth value to the second object based on the first motion amount and the second motion amount.

According to an embodiment of the present disclosure, the image processing module 180 may obtain a plurality of images for the scene, identify whether a motion amount corresponding to the object in the plurality of images meets a predetermined value, and apply a predetermined effect to an image area corresponding to the object, at least, based on a result of the identification. The motion amount may correspond to a difference between a position of the object in a first image of the plurality of images and a position of the object in a second image of the plurality of images.

According to an embodiment of the present disclosure, the image processing module 180 may select, as the first image and the second image, a pair of images having a difference in motion amount not less than a predetermined value from among a plurality of preview images for the scene. The first image area may correspond to a first depth for the scene, and the second image area correspond to a second depth for the scene.

According to an embodiment of the present disclosure, the object may include a figure. The image processing module 180 may blur a background other than the figure and output an image including the figure and the blurred background as an image corresponding to the scene. Each of the plurality of images may be obtained as the electronic device performs capturing at a different position.

According to an embodiment of the present disclosure, the image processing module 180 may obtain a first image and a second image, compare the first image with the second image to identify a motion amount of each of at least one object of the first image, obtain depth information on each of the at least one object based on the motion amount of each of the at least one object, and generate a depth map for the first image based on the obtained depth information.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the first and second external electronic devices 102 and 104, or the server 106). According to an embodiment of the present disclosure, when the electronic device 101 should perform some function or service automatically or at a request, the electronic device 101, instead of executing the function or service on its own or additionally, may request another device (e.g., the first and second external electronic devices 102 and 104, or the server 106) to perform at least some functions associated therewith. The other electronic device (e.g., the first and second external electronic devices 102 and 104, or the server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 1B:
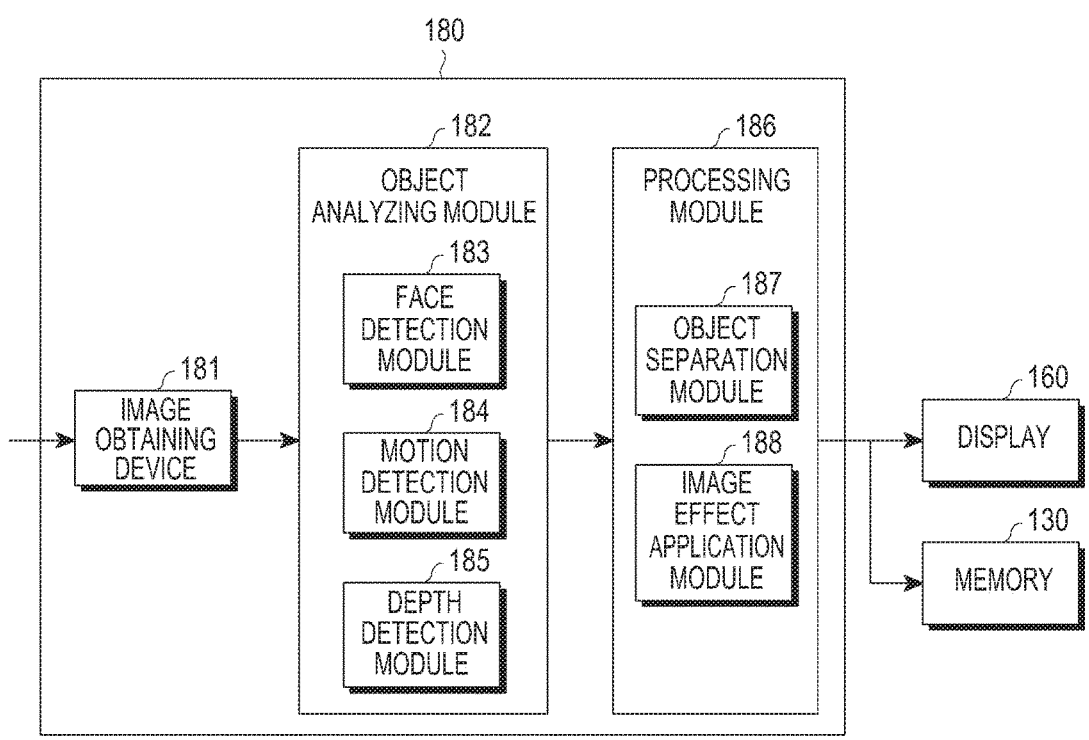
FIG. 1B is a block diagram illustrating an electronic device according to an embodiment of the present disclosure.

FIG. 1B is a block diagram illustrating an electronic device according to an embodiment of the present disclosure.

Referring to FIG. 1B, the image processing module 180 may include an image obtaining device 181, an object analyzing module 182, and a processing module 186.

The image obtaining device 181 may be an interface device that may receive images from the camera module, communication module, or memory. Depending on implementations, the image obtaining device 181 may also include at least one of a camera module, communication module, and a memory that may obtain and/or store images.

The object analyzing module 182 may receive an image from the image obtaining device 181. A face detection module 183 may detect the figure's face from the obtained image. The face detection module 183 may detect the figure's face from the image based on various face recognition algorithms which is described below in greater detail. A motion detection module 184 may detect whether at least one object in the first image moves or the amount of motion by comparing the first image with the second image. The motion detection module 184 may detect whether there is the motion or the amount of motion by the comparison in object position in each of the first image and the second image. A depth detection module 185 may detect a depth value for an object in the image. For example, the camera module may output an image including depth information, and the depth detection module 185 may detect a per-object depth value based on the obtained depth information. The depth detection module 185 may detect the per-object depth value by analyzing the image using a pre-stored algorithm.

The processing module 186 may receive an image that has undergone at least one of face detection, motion detection, and depth detection. According to an embodiment of the present disclosure, the processing module 186 may include an object separation module 187 and an image effect application module 188. The object separation module 187 may separate an object from the image, e.g., segmentation. According to an embodiment of the present disclosure, the object separation module 187 may perform object segmentation based on the amount of motion or at least one of the amount of motion, color information, and depth value. The image effect application module 188 may apply an image effect to each segmented object. According to an embodiment of the present disclosure, the image effect application module 188 may apply a blurring effect. The image effect-applied image may be displayed on the display 180 or stored in the memory 130.

Figure 2:
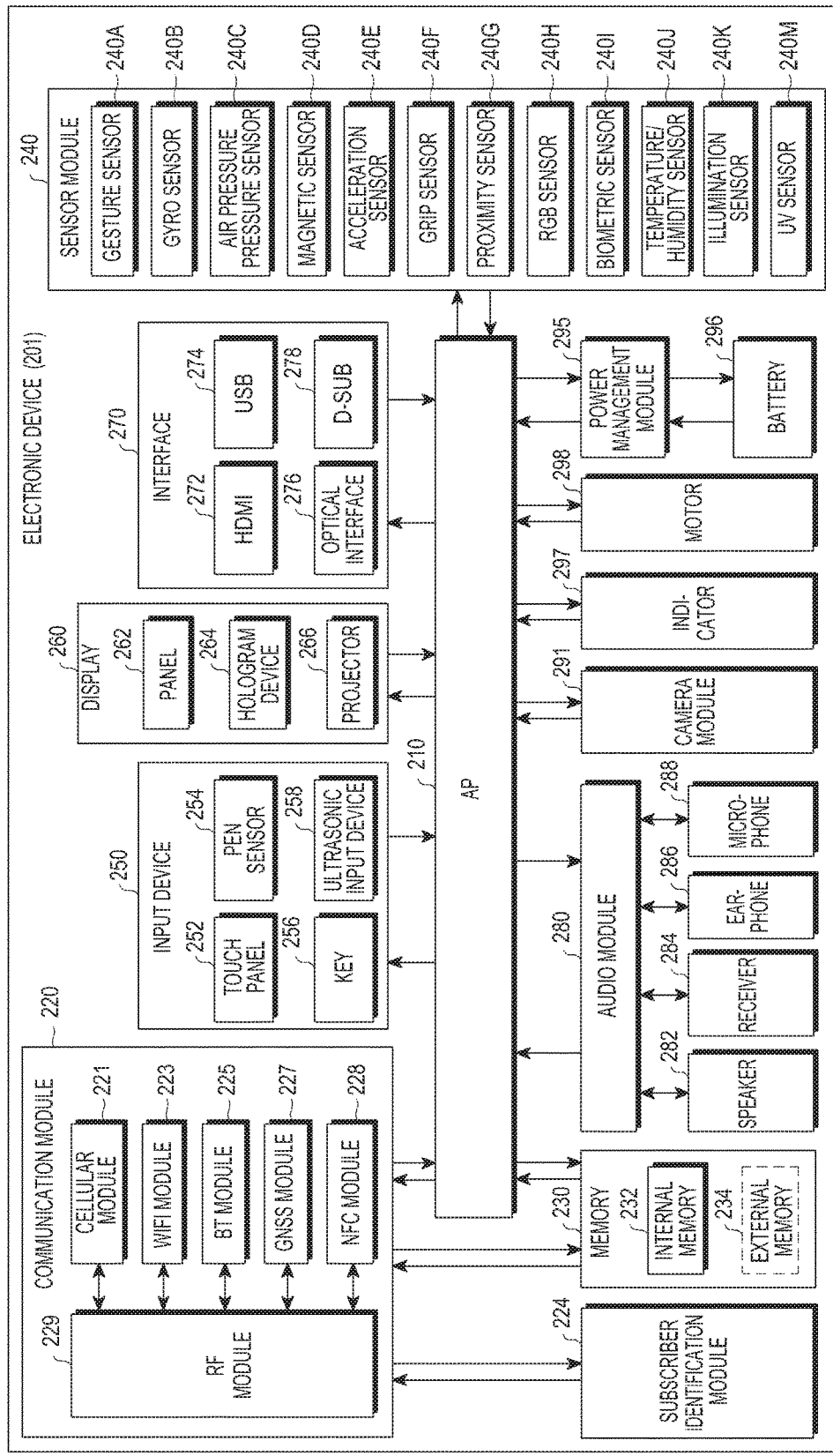
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may include the whole or part of the configuration of, e.g., the electronic device 101 shown in FIG. 1A. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphics processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1A. The communication module 220 may include, e.g., a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP.

The Wi-Fi module 223, the Bluetooth module 225, the GNSS module 227, or the NFC module 228 may include a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1A. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., an HDMI 272, a USB 274, an optical interface 276, or a D-subminiature (D-sub) 278. The interface 270 may be included in e.g., the communication interface 170 shown in FIG. 1A. Additionally or alternatively, the interface 270 may include a mobile high-definition link (MHL) interface, a SD card/MMC interface, or infrared data association (IrDA) standard interface.

The audio module 280 may convert a sound into an electric signal or vice versa, for example. At least a part of the audio module 280 may be included in e.g., the input/output interface 150 as shown in FIG. 1A. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp.

The power manager module 295 may manage power of the electronic device 201, for example. Although not shown, according to an embodiment of the present disclosure, the power manager module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
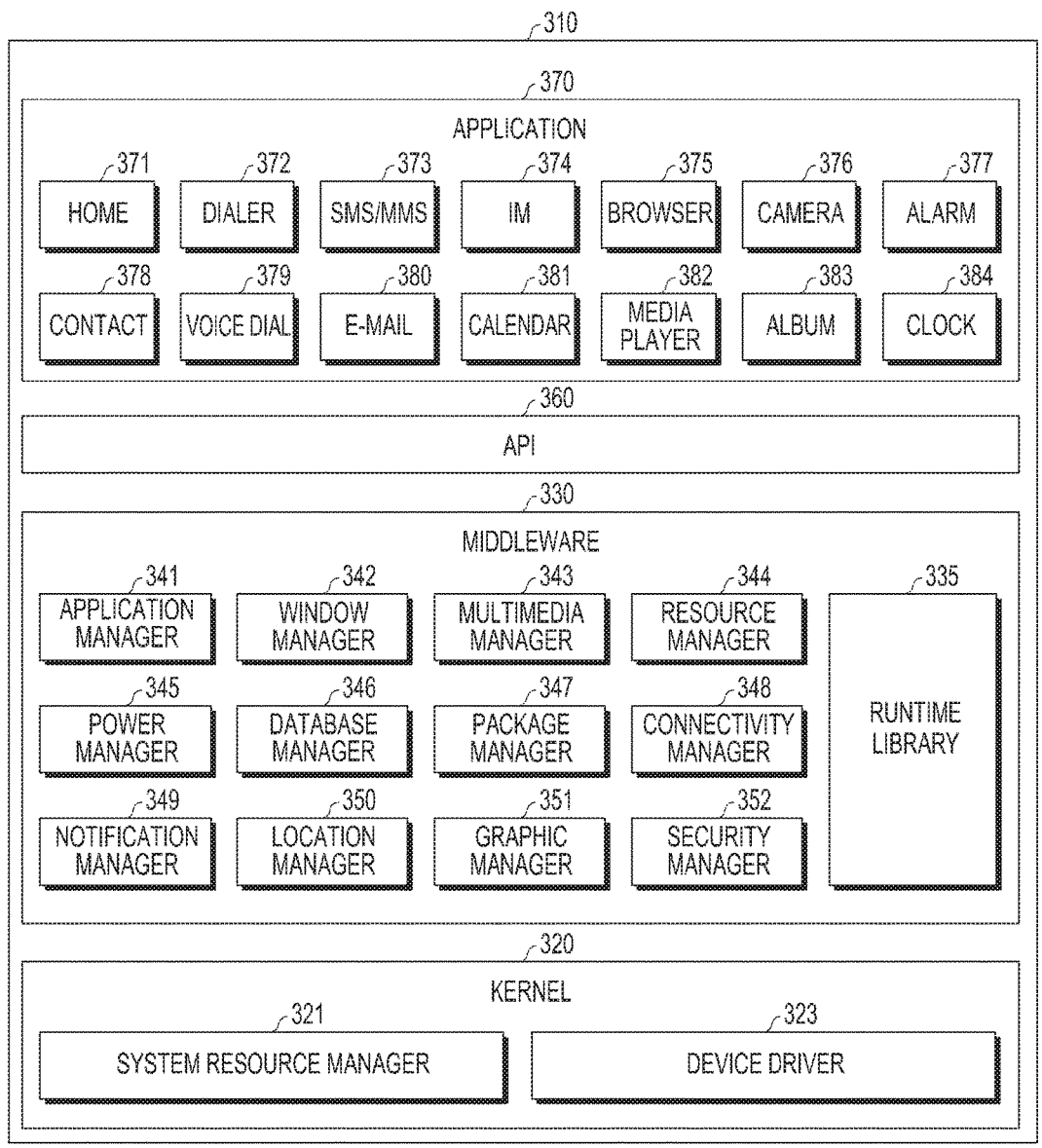
FIG. 3 is a block diagram illustrating a program module according to an embodiment of the present disclosure.

FIG. 3 is a block diagram illustrating a program module according to an embodiment of the present disclosure.

Referring to FIG. 3, a program module 310 (e.g., the program 140) may include an OS controlling resources related to the electronic device (e.g., the electronic device 101) and/or various applications (e.g., the AP 147) driven on the OS. The OS may include, e.g., Android, iOS, Windows, Symbian, Tizen, or Bada.

The program 310 may include, e.g., a kernel 320, middleware 330, an API 360, and/or an application 370. At least a part of the program module 310 may be preloaded on the electronic device or may be downloaded from an external electronic device (e.g., the first and second external electronic devices 102 and 104, or the server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface (UI). The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may be provided a specified module per type of the OS in order to provide a differentiated function. Further, the middleware 330 may dynamically omit some existing components or add new components.

The API 360 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 370 (e.g., the AP 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the first and second external electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the first and second external electronic devices 102 and 104). Further, the notification relay application may receive notification information from, e.g., the external electronic device and may provide the received notification information to the user.

The device management application may perform at least some functions of the external electronic device (e.g., the first and second external electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the first and second external electronic devices 102 and 104). According to an embodiment of the present disclosure, the application 370 may include an application received from the external electronic device (e.g., the server 106 or first and second external electronic devices 102 and 104). According to an embodiment of the present disclosure, the application 370 may include a preloaded application or a third party application downloadable from a server. The names of the components of the program module 310 according to the shown embodiment may be varied depending on the type of OS.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The various embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Figure 4:
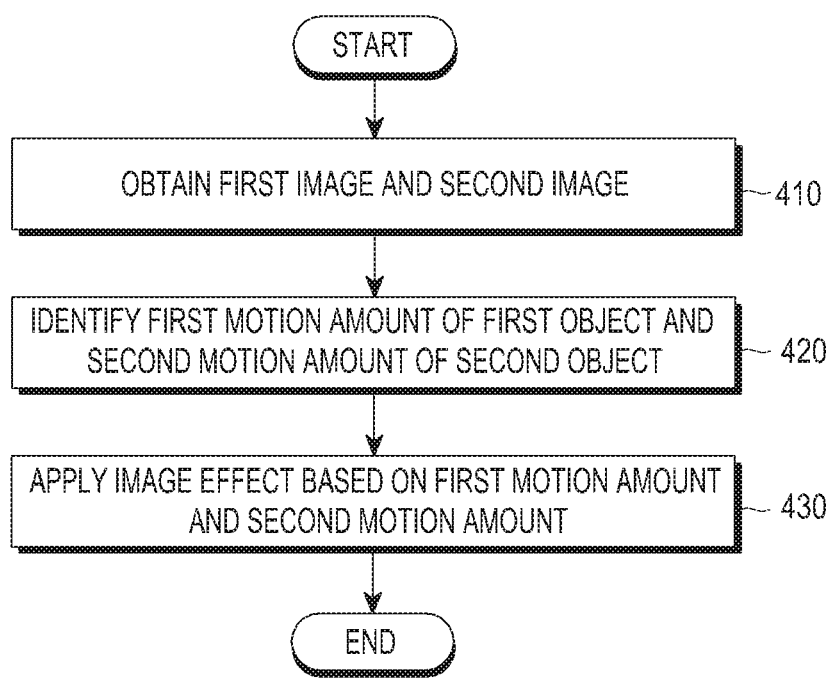
FIG. 4 is a flowchart illustrating a method for controlling an electronic device according to an embodiment of the present disclosure.

FIG. 4 is a flowchart illustrating a method for controlling an electronic device according to an embodiment of the present disclosure.

The embodiment related to FIG. 4 is described in greater detail with reference to FIGS. 5A to 5E.

FIGS. 5A to 5E are concept views illustrating an electronic device according to various embodiments of the present disclosure.

Figure 5A:
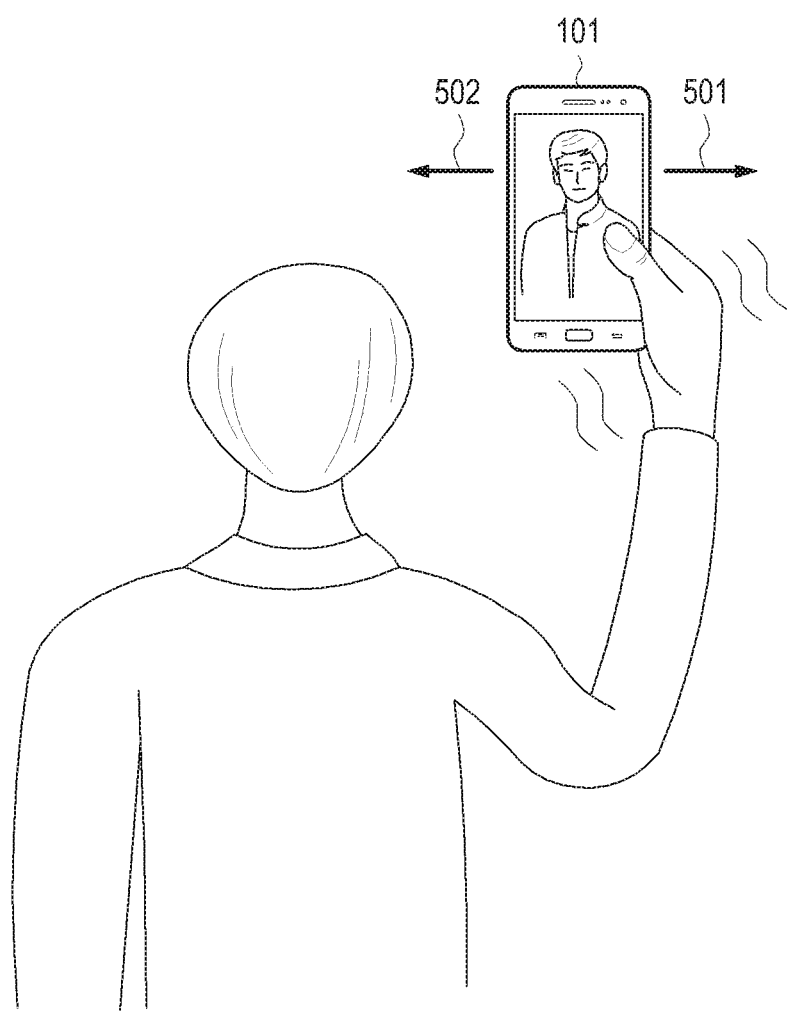
FIGS. 5A to 5E are concept views illustrating an electronic device according to various embodiments of the present disclosure.

Referring to FIG. 4, in operation 410, the electronic device 101 may obtain a plurality of images. Here, the plurality of images may be images captured at different capturing positions. For example, as shown in FIG. 5A, the user may image-capture himself while holding the electronic device 101. The electronic device 101 may generate and display a preview image using light incident onto the camera module provided in the front surface. However, the user's hand holding the electronic device 101 may tremble. As the user's hand trembles, the electronic device 101 may move in directions 501 and 502. As the electronic device 101 moves in directions 501 and 502, the position where the electronic device 101 captures the user may be varied. For example, the electronic device 101 may capture and store a first image captured at a first capturing position corresponding to the first movement 501 and capture and store a second image captured at a second capturing position corresponding to the second movement 502. The position of the facial area of the user in the first image may differ from the position of the facial area of the user in the second image, and such difference may be attributed to difference in capturing position. That is, even when the subject does not move, a subject motion may occur in the image due to the movement of the electronic device 101.

In operation 420, the electronic device 101 may identify a first motion amount of a first object and a second motion amount of a second object. In operation 430, the electronic device 101 may identify a first motion amount of a first object and a second motion amount of a second object. Specifically, as shown in FIG. 5A, the electronic device 101 may obtain the motion amount of the facial area based on the difference in position between the facial areas in the first image and second image. Here, the motion amount may be a difference in position of facial area between the first image and the second image.

The electronic device 101 may separate the facial area from the background area for the first image or second image based on the motion amount of the facial area and may separate the figure area including the facial area and body area from the background area. Further, the electronic device 101 may apply an image effect based on the result of separation. For example, the electronic device 101 may apply a blurring effect to the portion other than the facial area or may apply a blurring effect to a portion other than the figure area.

According to an embodiment of the present disclosure, the electronic device 101 may segment the figure area from the background area using at least one of color information and phase information in addition to the motion amount of the facial area. The electronic device 101 may output a blurring effect-applied image to the background area based on the segmentation result. Accordingly, the electronic device 101 may output the image processed as if it has been out-focused even though the electronic device 101 does not include a high-end camera module having the out-focusing function. According to an embodiment of the present disclosure, the electronic device 101 may obtain the motion amount for the facial area or each of other objects and may obtain depth information on each of at least one object in the image. The electronic device 101 may generate a depth map or a 3D map based on the obtained depth information. Accordingly, the electronic device 101 may generate and output the 3D map even without applying a sophisticated algorithm such as existing 3D map algorithms. Further, even absent phase pixels such as in the two photo-diodes (2PD) system, the electronic device 101 may obtain phase information such as depth information according to an embodiment of the present disclosure.

Figure 5B:
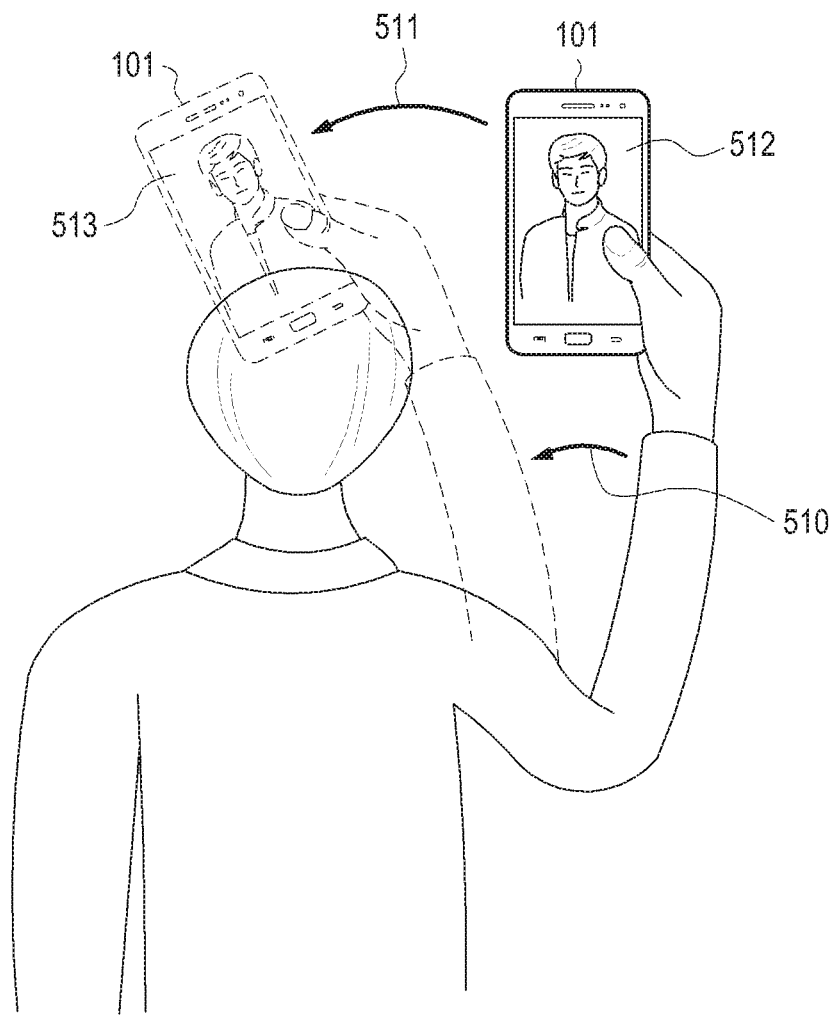

FIG. 5B is a concept view illustrating an operation of an electronic device according to an embodiment of the present disclosure.

Referring to FIG. 5B, the user may image-capture himself while holding the electronic device 101. The electronic device 101 may generate and display a preview image using light incident onto the camera module provided in the front surface. However, the user may move his arm in direction 510 while holding the electronic device 101 to move the capturing position of the electronic device 101

As the user's arm moves, the electronic device 101 may move in direction 511. As the electronic device 101 moves in direction 511, the position where the electronic device 101 captures the user may be varied. For example, the electronic device 101 may capture and store a first image 512 captured at a first capturing position and capture and store a second image 513 captured at a second capturing position. The position of the facial area of the user in the first image 512 may differ from the position of the facial area of the user in the second image 513, and such difference may be attributed to difference in capturing position. The electronic device 101 may obtain the motion amount of the facial area based on the difference in position between the facial areas in the first image 512 and second image 513. The electronic device 101 may perform segmentation on the first image 512 or the second image 513 based on the motion amount of the facial area and may separate the figure area including the facial area and the body area from the background area. According to an embodiment of the present disclosure, the electronic device 101 may separate the figure area from the background area using at least one of the motion amount of the facial area, color information and phase information. The electronic device 101 may output a blurring effect-applied image to the background area based on the separation result. Accordingly, the electronic device 101 may output the image processed as if it has been out-focused even though the electronic device 101 does not include a high-end camera module having the out-focusing function. According to an embodiment of the present disclosure, the electronic device 101 may identify the motion amount for the facial area or each of other objects and may obtain depth information on each of at least one object in the image. The electronic device 101 may generate a depth map or a 3D map based on the obtained depth information. Accordingly, the electronic device 101 may generate and output the 3D map even without applying a sophisticated algorithm such as existing 3D map algorithms. Further, even absent phase pixels such as in the 2PD system, the electronic device 101 may obtain phase information such as depth information according to an embodiment of the present disclosure.

Figure 5C:
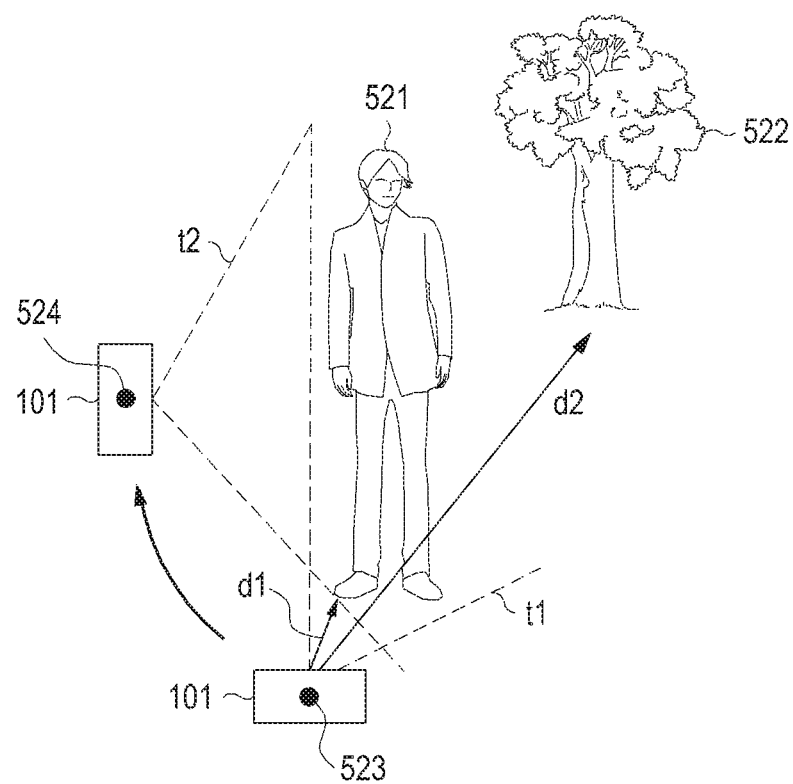
Figure 5D:
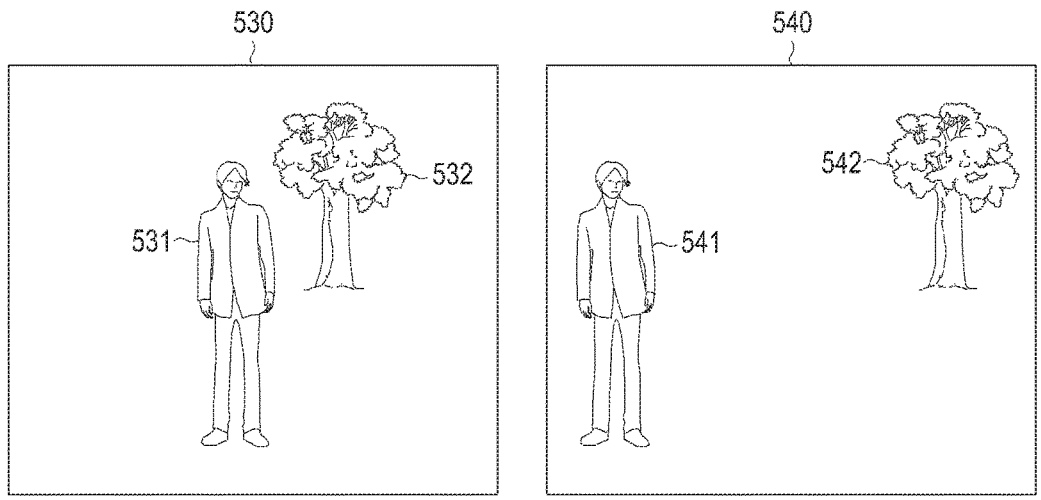
Figure 5E:
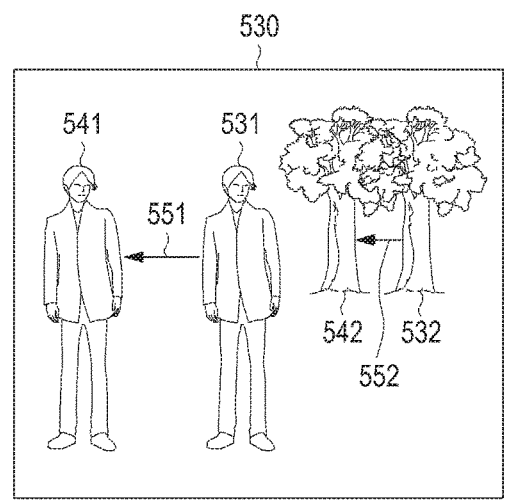

FIGS. 5C to 5E are concept views illustrating capturing by an electronic device according to an embodiment of the present disclosure.

Referring to FIG. 5C, the electronic device 101 may capture t1 which is a scene including at least one subject 521 and 522 from a first position 523. Further, the electronic device 101 change the capturing position to capture t2 which is a scene including the at least one subject 521 and 522 from a second position 524.

Further, as described above, the user may conduct capturing while holding the electronic device 101. When the user holds the electronic device 101, the capturing position of the electronic device 101 may be varied from the first position to a second position due to, e.g., the user's hand trembling. The electronic device 101 may continuously capture image after entry into a capturing mode for displaying a preview image. The electronic device 101 may obtain a plurality of images with different capturing positions based on the change in the capturing position due to, e.g., the user's hand tremble while continuously capturing image in the capturing mode.

According to an embodiment of the present disclosure, the user may move the electronic device 101 from the first position 523 to the second position 524 while holding the electronic device 101. For example, the electronic device 101 may output a position inducing message for moving the electronic device 101, and the user may identify the message to conduct capturing while varying the capturing position. In the embodiment related to FIG. 5C, it is assumed that the distance between the electronic device 101 and the first subject 501 is a first distance d1, and the distance between the electronic device 101 and the second subject 502 is a second distance d2.

FIG. 5D is a concept view illustrating an image according to an embodiment of the present disclosure.

Referring to FIG. 5D, the first image 530 of FIG. 5D may be the image t1 captured at the first position 523 of FIG. 5C, and the second image 540 may be an image t2 captured at the second position 524 of FIG. 5C. The first image 530 may include a first object 531 corresponding to the first subject 521 and a second object 532 corresponding to the second subject 522, and the second image 540 may include a first object 541 corresponding to the first subject 521 and a second object 542 corresponding to the second subject 522.

Referring to FIG. 5E, the electronic device 101 may identify the motion amount of each of at least one object in the image. FIG. 5E illustrates a result of the comparison between the first image 530 and the second image 540 of FIG. 5D. The electronic device 101 may compare the first image 530 with the second image 540 to determine the motion amount 551 for the first objects 531 and 541. For example, the electronic device 101 may compare the pixel position of the first object 531 with the pixel position of the first object 541 to determine the difference in pixel position and may determine the motion amount 551 corresponding to the determined position of pixel. That is, the motion amount 551 may mean the degree of movement of the first object 531 and 541 in the image, that is, the pixel difference. The electronic device 101 may identify the first object 531 in the first image 530 and the first object 541 in the second image 540. The electronic device 101 may determine that the identified first objects 531 and 541 are the same object, and thus, the electronic device 101 may determine the motion amount 551 between the first objects 531 and 541 upon comparison between the first image 530 and the second image 540. According to an embodiment of the present disclosure, the electronic device 101 may store object recognition algorithms for various objects, such as figures or trees, and accordingly, the electronic device 101 may recognize the first object 531 corresponding to a figure and the second object 532 corresponding to a tree in the first image 530 and may recognize the first object 541 corresponding to a figure and the second object 542 corresponding to a tree in the second image 540. Meanwhile, according to an embodiment of the present disclosure, the 101 may trace the face using a face recognition algorithm which is described below in further detail.

The electronic device 101 may separate objects based on the motion amount of each of at least one object. As shown in FIG. 5E, the motion amount 551 of the first object 531 and 541 may be larger than the motion amount 552 of the second object 532 and 542. This may be attributed to the first distance d1 between the electronic device 101 and the first subject 521 being smaller than the second distance d2 between the electronic device 101 and the second subject 522. When the distance from the subject is relatively small, the motion of the object in the image as the capturing position varies, that is, the motion amount, may be relatively large, and when the distance from the subject is relatively large, even when the capturing position is varied, the motion amount of object in the image may be relatively small. The electronic device 101 may separate the first object 531 and the second object 532 having different motion amounts in a distinguished manner. Further, the electronic device 101 may separate the first object 531 and the second object 532 from the background. The electronic device 101 may perform object separation based on the per-object motion amount. Since the per-object motion amount differs means that the distance to the subject corresponding to the object differs, the electronic device 101 may determine that the objects having different motion amounts are different from each other and perform segmentation. The electronic device 101 may perform segmentation based on at least one of motion amount, color information, and depth information which is described below in greater detail. As described above, the electronic device 101 may perform object segmentation and application of an image effect to each of the separated object based on the per-object motion amount using a plurality of images.

According to an embodiment of the present disclosure, the electronic device 101 may include dual cameras, i.e., cameras disposed at an interval on one surface. The electronic device 101 may perform calculation of the motion amount of object, classification of objects, and segmentation of objects through a plurality of images obtained through the dual cameras.

Figure 6:
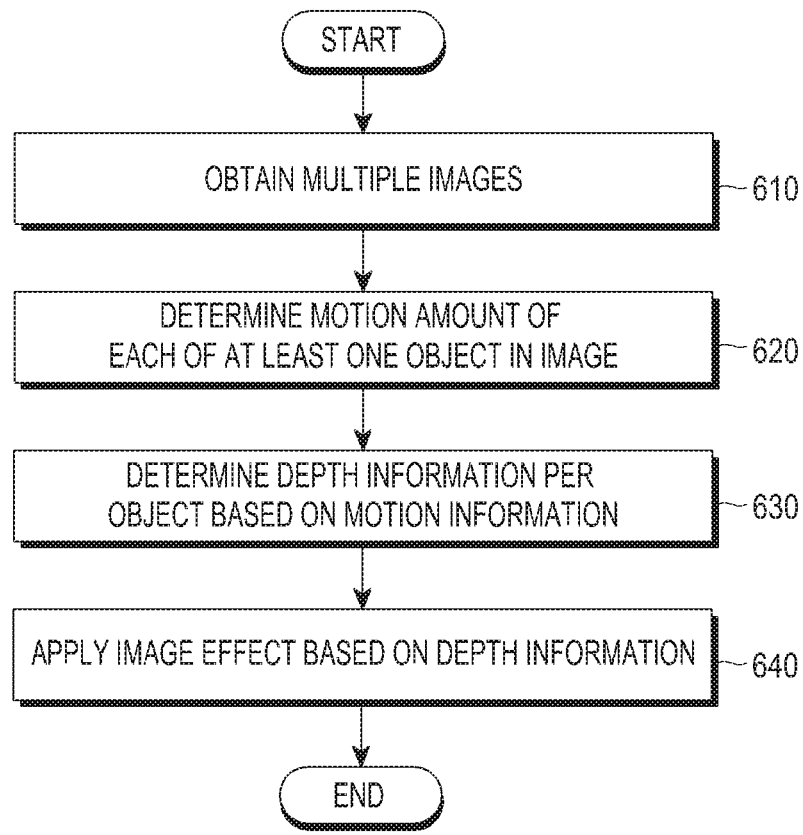
FIG. 6 is a flowchart illustrating a method for controlling an electronic device according to an embodiment of the present disclosure.

FIG. 6 is a flowchart illustrating a method for controlling an electronic device according to an embodiment of the present disclosure.

Referring to FIG. 6, in operation 610, the electronic device 101 may obtain a plurality of images. Here, the plurality of images may be images captured at different capturing positions. For example, as shown in FIG. 5C, the electronic device 101 may capture t1 which is a scene including at least one subject 521 and 522 at a first position 523. Further, the electronic device 101 change the capturing position to capture t2 which is a scene including at least one subject 521 and 522 at a second position 524. As set forth above, the electronic device 101 may obtain a plurality of images with different capturing positions based on various changes in position due to, e.g., the user's hand tremble or the user's intended change in position of the electronic device 101.

In operation 620, the electronic device 101 may identify the motion amount of each of at least one object in the image. As described above, the electronic device 101 may compare a plurality of images and identify the motion amount of each of at least one object in the image.

In operation 630, the electronic device 101 may determine the per-object depth information based on the motion amount of each of at least one object. As described above, when the distance from the subject is relatively small, the motion amount of the object in the image as the capturing position varies may be relatively large, and when the distance from the subject is relatively large, even when the capturing position is varied, the motion amount of object in the image may be relatively small. Thus, the electronic device 101 may set a relatively large depth value for an object having a relatively small motion amount and a relative small depth value for an object having a relatively large motion amount. The electronic device 101 may assign a depth value to each identified object, and in operation 640, the electronic device 101 may perform separation of objects, i.e., segmentation, based on the depth information. According to an embodiment of the present disclosure, the electronic device 101 may also generate a depth map or apply a 3D effect based on the depth value.

Figure 7:
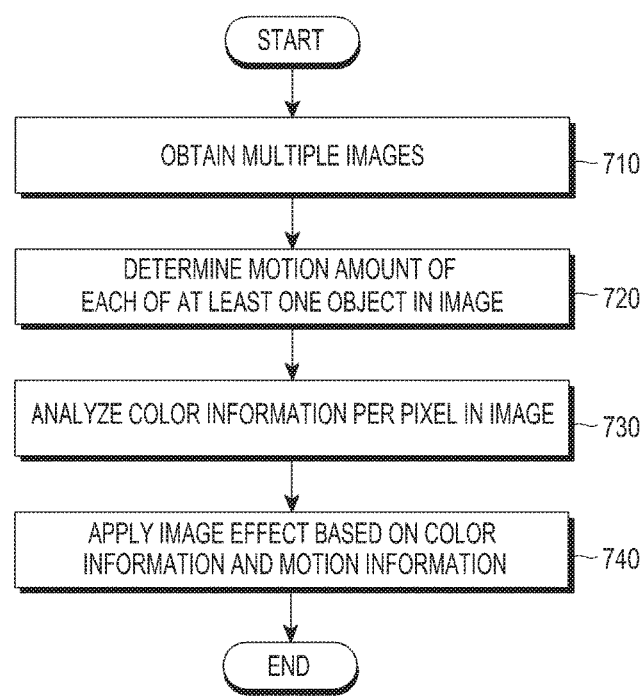
FIG. 7 is a flowchart illustrating a method for controlling an electronic device according to an embodiment of the present disclosure.

FIG. 7 is a flowchart illustrating a method for controlling an electronic device according to an embodiment of the present disclosure.

Referring to FIG. 7, in operation 710, the electronic device 101 may obtain a plurality of images. Here, the plurality of images may be images captured at different capturing positions. As set forth above, the electronic device 101 may obtain a plurality of images with different capturing positions based on various changes in position due to, e.g., the user's hand tremble or the user's intended change in position of the electronic device 101.

In operation 720, the electronic device 101 may determine the motion amount of each of at least one object in the image. As described above, the electronic device 101 may compare a plurality of images and determine the motion amount of each of at least one object in the image.

In operation 730, the electronic device 101 may analyze per-pixel color information on a target image of a plurality of images. In operation 740, the electronic device 101 may perform segmentation based on the analyzed color information and the motion amount of each of at least one object in the target image. According to an embodiment of the present disclosure, the electronic device 101 may generate a tri map based on the motion amount of each object and distinguish and separate objects based on the generated tri map and color information. The electronic device 101 may also generate a tri map based on the motion amount of each object and color information and may distinguish and separate objects based on the generated tri map and color information. Further, the electronic device 101 may apply an image effect to the separated object. The electronic device 101 may also primarily separate objects based on the color information and may then secondarily separate the objects based on motion amounts. The order may be changed, and the electronic device 101 may primarily separate objects based on the motion amounts and may then secondarily separate the objects based on the color information.

Figure 8:
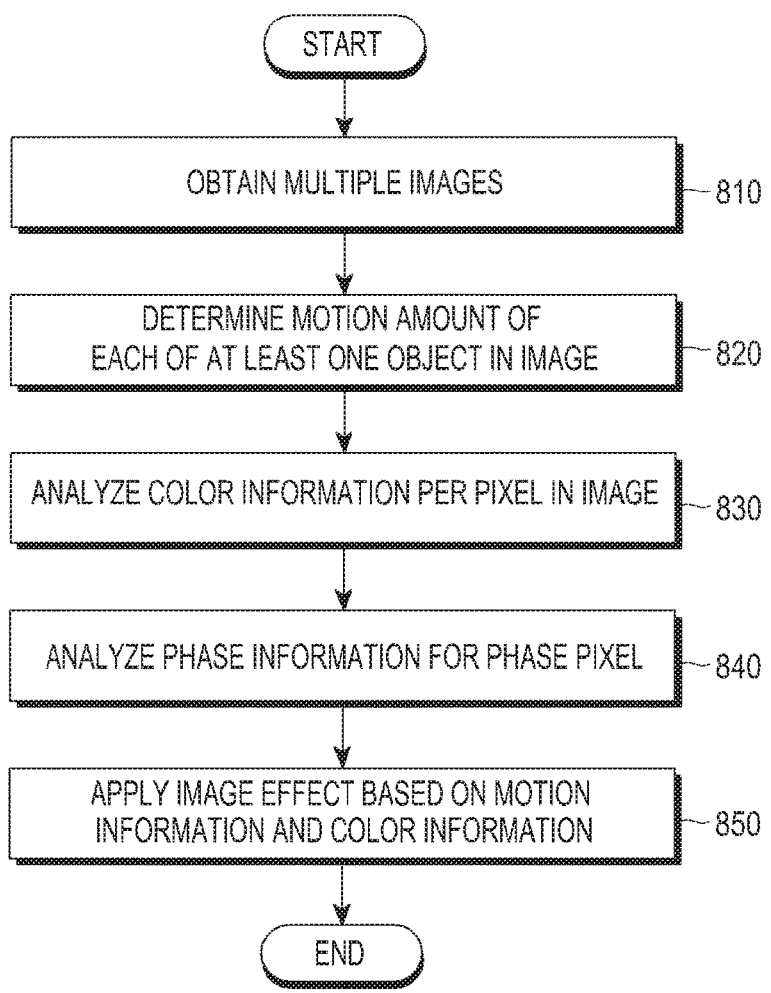
FIG. 8 is a flowchart illustrating a method for controlling an electronic device according to an embodiment of the present disclosure.

FIG. 8 is a flowchart illustrating a method for controlling an electronic device according to an embodiment of the present disclosure.

Referring to FIG. 8, in operation 810, the electronic device 101 may obtain a plurality of images. Here, the plurality of images may be images captured at different capturing positions. As set forth above, the electronic device 101 may obtain a plurality of images with different capturing positions based on various changes in position due to, e.g., the user's hand tremble or the user's intended change in position of the electronic device 101.

In operation 820, the electronic device 101 may determine the motion amount of each of at least one object in the image. As described above, the electronic device 101 may compare a plurality of images and determine the motion amount of each of at least one object in the image.

In operation 830, the electronic device 101 may analyze per-pixel color information on a target image of a plurality of images. In operation 840, the electronic device 101 may analyze phase information on the phase pixel of the target image. According to an embodiment of the present disclosure, the electronic device 101 may include a phase pixel such as 2PD. The phase pixel such as 2PD may include a plurality of photo diodes in one pixel unit. In such case, the first light reception amount measured by the first photo diode in one pixel unit may differ from the second light reception amount measured by the second photo diode. The electronic device 101 may analyze the phase information based on the difference in light reception amount between the two photo diodes in one pixel unit. For example, the electronic device 101 may analyze depth information in the corresponding pixel based on the difference in light reception amount.

In operation 850, the electronic device 101 may perform segmentation based on the analyzed color information, phase information, and the motion amount of each of at least one object in the target image. According to an embodiment of the present disclosure, the electronic device 101 may generate a tri map based on the motion amount of each object and perform segmentation based on the generated tri map, color information, and phase information. The electronic device 101 may also generate a tri map based on the motion amount of each object, phase information, and color information and may perform segmentation based on the generated tri map, phase information, and color information. The electronic device 101 may also primarily perform segmentation based on the color information and phase information and may then secondarily perform segmentation based on the motion amount. The order may be changed, and the electronic device 101 may primarily perform segmentation based on the motion amount, and may then secondarily perform segmentation based on the color information and phase information. Meanwhile, according to an embodiment of the present disclosure, the electronic device 101 may perform segmentation based on the motion amount and phase information.

Figure 9A:
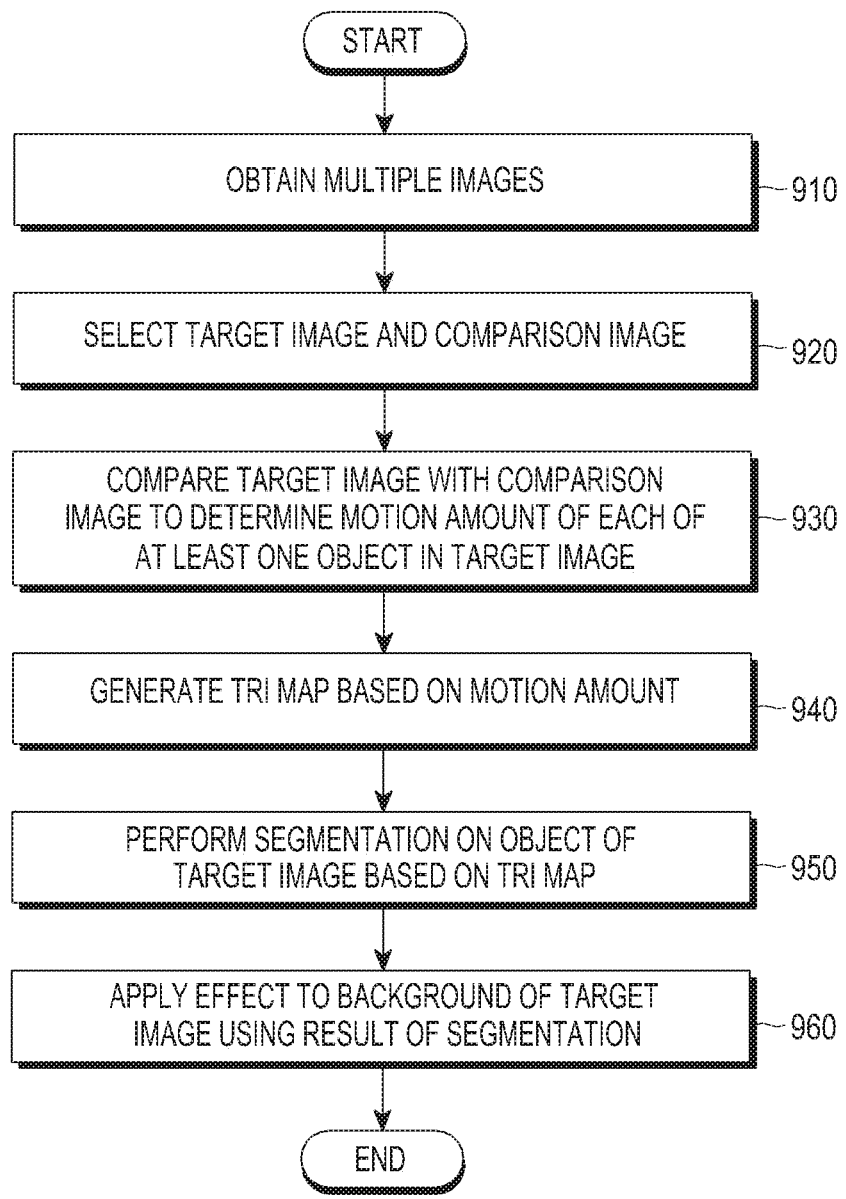
FIG. 9A is a flowchart illustrating a method for controlling an electronic device according to an embodiment of the present disclosure.

FIG. 9A is a flowchart illustrating a method for controlling an electronic device according to an embodiment of the present disclosure.

Referring to FIG. 9A, in operation 910, the electronic device 101 may obtain a plurality of images. Here, the plurality of images may be images captured at different capturing positions. As set forth above, the electronic device 101 may obtain a plurality of images with different capturing positions based on various changes in position due to, e.g., the user's hand tremble or the user's intended change in position of the electronic device 101.

In operation 920, the electronic device 101 may select a target image and a comparison image from a plurality of images. Here, the target image may be an image to which segmentation and an additional effect are to be applied. According to an embodiment of the present disclosure, the electronic device 101 may select the target image based on the user's input through the GUI. The electronic device 101 may also select the target image based on a pre-stored algorithm. For example, the electronic device 101 may select, as the target image, an image meeting a pre-designated level of illumination intensity information or color information among the plurality of images. The electronic device 101 may also select, as the target image, an image where the similarity between an object such as eye, nose, or mouth, and a pre-designated template exceeds a threshold, i.e., meets a pre-designated value, among a plurality of images including a figure's face. It will be apparent to one of ordinary skill in the art that the configuration for the electronic device 101 to determine the target image of the plurality of images is not limited thereto.

The electronic device 101 may be selected, as the comparison image, an image with a difference from the target image exceeding a threshold among the plurality of images. As the difference in position between objects of the target image and comparison image increases, the motion amount may increase. As the motion amount increases, the electronic device 101 may perform segmentation more precisely. Accordingly, the electronic device 101 may select, as the comparison image, an image having the largest difference from the target image. Meanwhile, the electronic device 101 may select, as the comparison image, an image including an object to be traced (hereinafter, simply referred to as traced object) of the target image. That is, in an embodiment, the electronic device 101 may select, as the comparison image, an image having the largest difference from the target image of the images including the traced object of the target image.

In operation 930, the electronic device 101 may comparison the target image with the comparison image to determine the motion amount of each of at least one object in the image. As set forth above, each of the target image and the comparison image may include a traced object, and the traced object may correspond to the same subject. In one embodiment, the traced object may be the face, and the electronic device 101 may determine the position of the traced object in the target image and the position of the traced object in the comparison image using a face recognition algorithm. The electronic device 101 may compare the positions of the traced objects in the target image and the comparison image to determine the motion amount.

In operation 940, the electronic device 101 may generate a tri map based on the motion amount. For example, referring to FIG. 9B, the electronic device 101 may generate a tri map 980 from the target image 970.

Figure 9B:
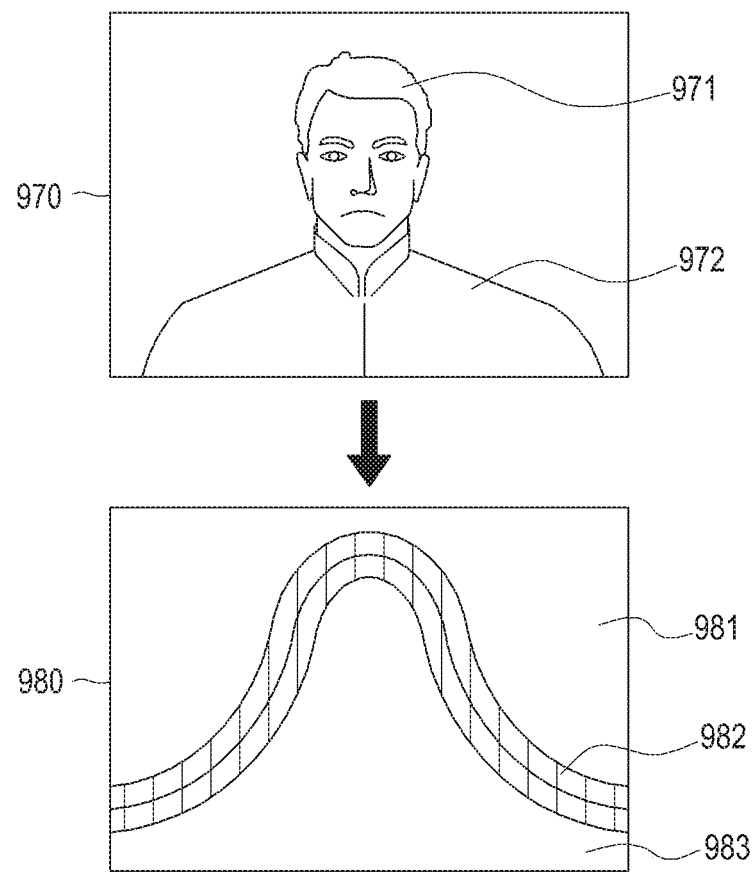
FIG. 9B is a concept view illustrating a tri map according to an embodiment of the present disclosure.

FIG. 9B is a concept view illustrating a tri map according to an embodiment of the present disclosure.

Referring to FIG. 9B, the target image 970 may be an image obtained by capturing the face and may include a face object 971 and a body object 972. The electronic device 101 may trace, e.g., the face object 971 to detect the face object from the comparison image and may determine the motion amount of the face object 971. The electronic device 101 may generate a tri map 980 based on the motion amount of the face object 971. The tri map 980 may include a background area 981, an undefined area 982, and a figure area 983. The electronic device 101 may classify the area having the motion amount corresponding to the motion amount of the face object 971 as the figure area 983. The electronic device 101 may classify the area having the motion amount exceeding the threshold of the motion amount of the face object 971 as the background area 981. The electronic device 101 may classify the area other than the figure area 983 and the background area 981 as the undefined area 982. Meanwhile, the electronic device 101 may generate the tri map 980 further using the color information. Meanwhile, the electronic device 101 may generate the tri map 980 further using the phase information. Meanwhile, the electronic device 101 may generate the tri map 980 further using the phase information and color information.

Referring again to FIG. 9A, in operation 950, the electronic device 101 may perform segmentation on the target image based on the tri map 980. For example, the electronic device 101 may perform segmentation on the undefined area 982 of the tri map 980. The electronic device 101 may re-separate the pixel of the undefined area 982 as one of the figure area 983 or the background area 981 based on at least one of color information and phase information of the undefined area 982. Accordingly, the electronic device 101 may segment the figure area 971 and 972 from the background in the target image 970.

In operation 960, the electronic device 101 may apply an effect to the background of the target image using the result of segmentation. For example, the electronic device 101 may apply a blurring effect to the background. Of the image output from the electronic device 101, the figure area might not go through the blurring effect while the background may undergo the blurring effect, leading to an out-focused effect.

The above-described generation of tri map is merely an example, and as set forth above, according to an embodiment of the present disclosure, the electronic device 101 may perform segmentation based on the motion amount of object. That is, the electronic device 101 may separate an object having a motion amount of the traced object and a motion amount less than a predesignated threshold as one object, e.g., a figure object. The electronic device 101 may apply an image effect, e.g., blurring effect, to each object based on the result of segmentation.

Figure 10:
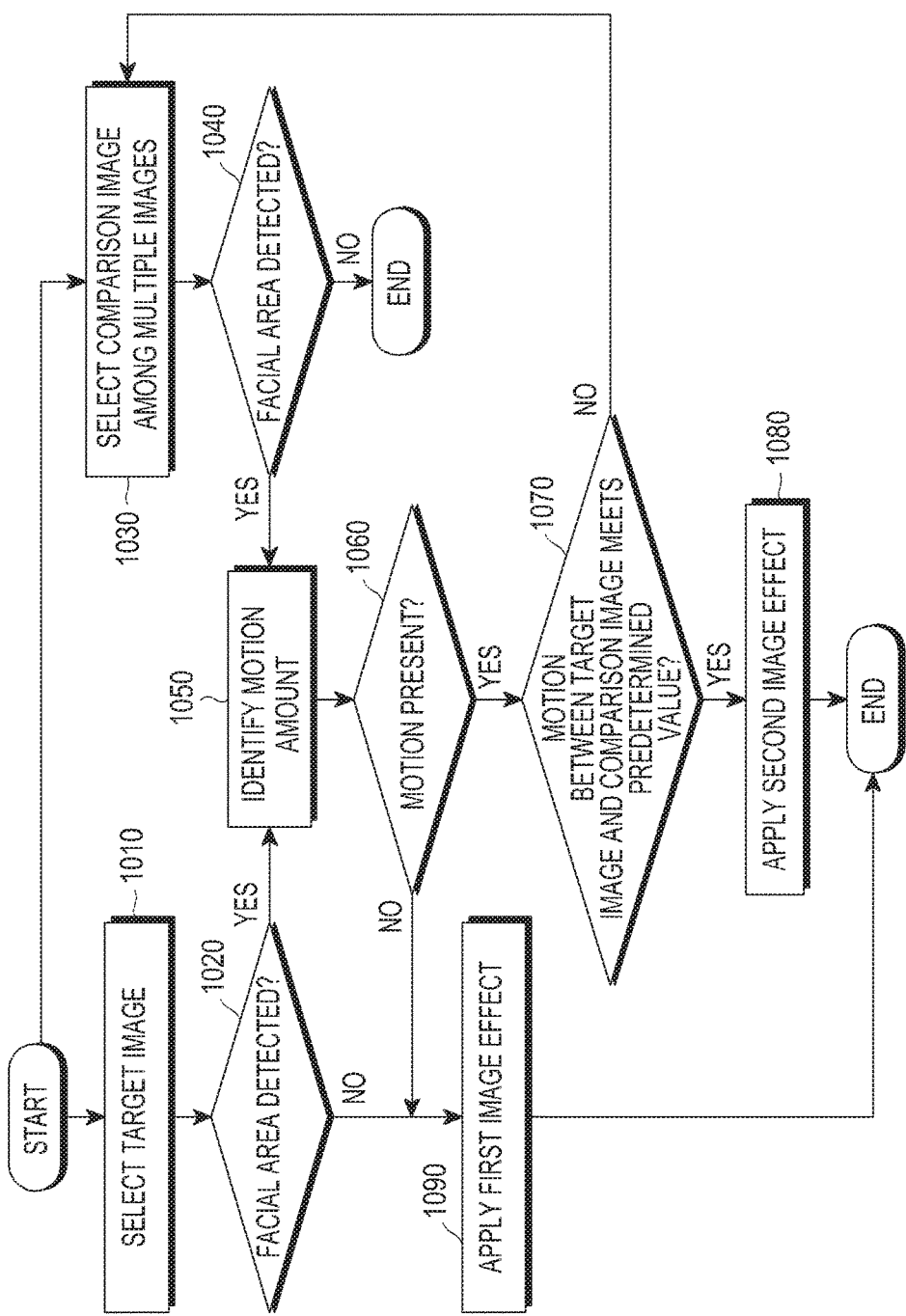
FIG. 10 is a flowchart illustrating a method for controlling an electronic device according to an embodiment of the present disclosure.

FIG. 10 is a flowchart illustrating a method for controlling an electronic device according to an embodiment of the present disclosure.

Referring to FIG. 10, in operation 1010, the electronic device 101 may select a target image from a plurality of images. According to an embodiment of the present disclosure, the electronic device 101 may select the target image by the user's selection or based on a predesignated algorithm. In operation 1020, the electronic device 101 may determine whether a facial area has been detected from the target image. In the embodiment related to FIG. 10, the electronic device 101 is assumed to perform segmentation on the figure in the image. Unless the facial area is detected, the electronic device 101 may terminate the capturing or may select other image including the facial area among the plurality of images as the target image. In operation 1090, the electronic device 101 may also apply other image effect, i.e., a second image effect, unless the facial area is detected.

In operation 1030, the electronic device 101 may select a comparison image from a plurality of images. In operation 1040, the electronic device 101 may determine whether a facial area has been detected from the comparison image. In the embodiment related to FIG. 10, the electronic device 101 is assumed to separate the figure from the image. Unless the facial area is detected, the electronic device 101 may terminate the capturing or may select other image including the facial area among the plurality of images as the comparison image.

In operation 1050, the electronic device 101 may detect motion amount by comparing the target image with the comparison image. The electronic device 101 may compare the position of the facial area in the target image with the position of the facial area in the comparison image. For example, the electronic device 101 may compare the position of pixel corresponding to the facial area in the target image with the position of pixel corresponding to the facial area in the comparison image. The electronic device 101 may detect motion amount based on the result of comparison. The motion amount may be one for the traced object in each of the target image and comparison image, e.g., the difference in position of facial area. For example, the motion amount may include at least one of degree of motion of the traced object and motion direction.

In operation 1060, the electronic device 101 may determine whether there is a motion of the traced object, e.g., the motion of the facial area. In one embodiment, the electronic device 101 may determine whether there is a motion based on whether the motion amount exceeds a predesignated threshold, i.e., meets the predesignated value. When the motion amount is determined to be the predesignated threshold or less, the electronic device 101 may determine that there is no motion. The electronic device 101 may terminate the operation or may select other comparison image. When the motion amount is determined to exceed the predesignated threshold, the electronic device 101 may determine that there is a motion of the traced object, e.g., the facial area.

In operation 1070, the electronic device 101 may determine whether the motion between the target image and comparison image is largest, i.e., whether it meets a predesignated value. According to an embodiment of the present disclosure, the electronic device 101 may sequentially compare the target image with a plurality of comparison images and may determine the image with the largest motion as the final comparison image.

In operation 1080, the electronic device 101 may perform segmentation on object based on the motion amount determined based on the result of comparison between target image and comparison image and apply an image effect based on the result of segmentation. As set forth above, in one embodiment, the electronic device 101 may perform segmentation by classifying the object having substantially the same motion amount as the motion amount of the facial area as the figure area. For example, the target image may include the body area connected with the facial area. The comparison image also may include the body area connected with the facial area. The electronic device 101 may determine that the motion amount of facial area is substantially the same as the motion amount of the body area and may separate the facial area and body area, as a single figure area, from the background. Here, "substantially the same" may mean that the difference between the two motion amounts is less than a threshold. Further, as set forth above, the electronic device 101 may also output an image where a blurring effect additionally applies to the background.

Figure 11:
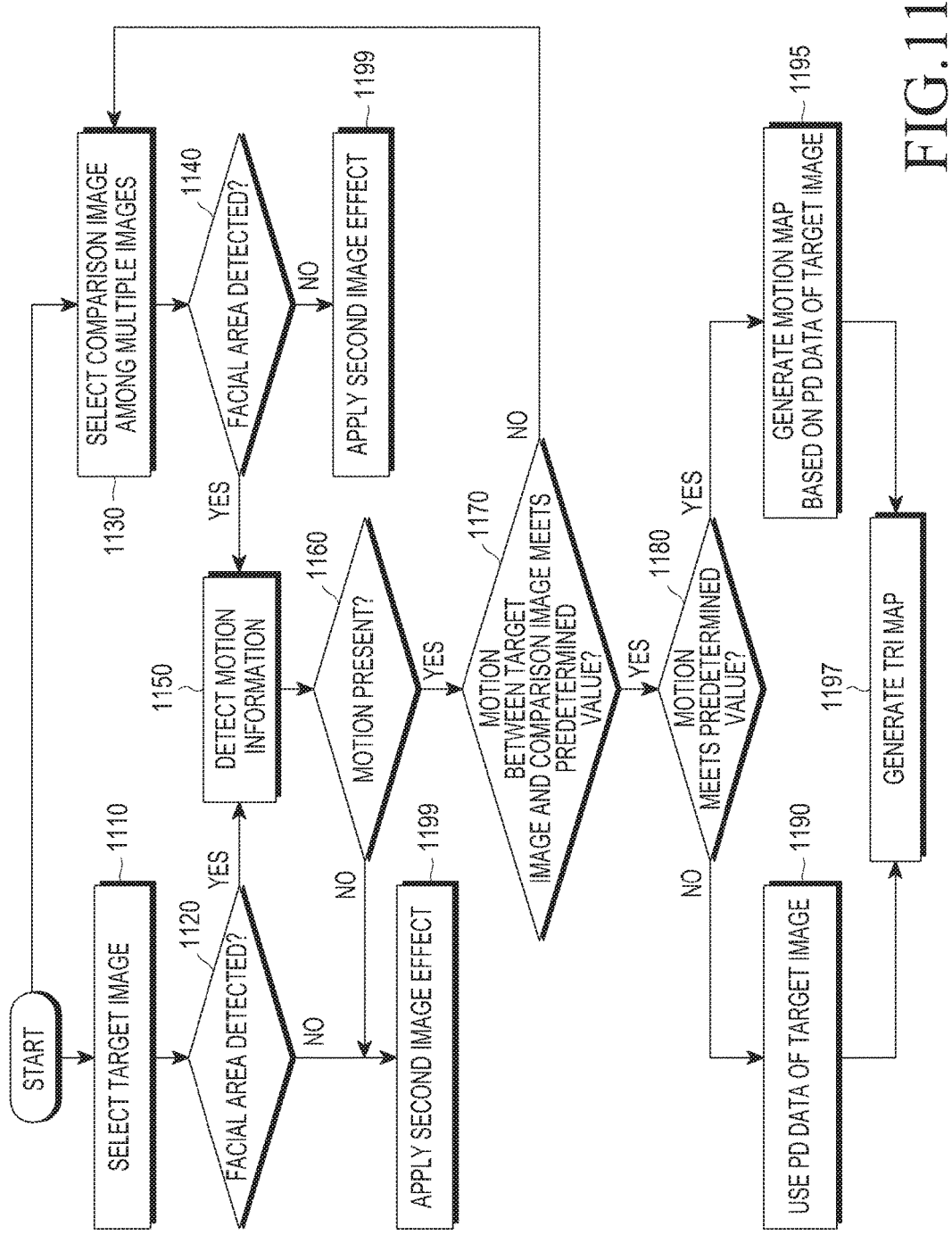
FIG. 11 is a flowchart illustrating a method for controlling an electronic device according to an embodiment of the present disclosure.

FIG. 11 is a flowchart illustrating a method for controlling an electronic device according to an embodiment of the present disclosure.

Referring to FIG. 11, operations 1110 to 1170 have been described in detail above in connection with operations 1010 to 1070 of FIG. 10, and no further detailed description thereof is given.

In operation 1180, the electronic device 101 may determine whether the magnitude of motion exceeds a threshold, i.e., meets a designated value. When the magnitude of motion is the threshold or less, the electronic device 101 in operation 1190 uses photo diode data of the target image to generate a tri map in operation 1197. That is, when the motion amount is not large enough, the electronic device 101 may generate a tri map using the photo diode data, rather than the motion amount. For example, the electronic device 101 may generate the tri map based on the per-pixel color information. When the electronic device 101 includes a phase pixel such as a 2PD system, the electronic device 101 may also generate the tri map based on phase information obtained from the phase pixel. The electronic device 101 may generate the tri map using phase information and color information.

When the magnitude of motion exceeds the threshold, the electronic device 101 may generate a motion map using the photo diode data of the target image in operation 1195. In operation 1197, the electronic device 101 may generate a tri map using the motion map. For example, the electronic device 101 may generate a tri map having the background area, foreground area (e.g., a figure area), and undefined area based on the motion amount of each object in the motion map. The electronic device 101 may combine together the objects corresponding to the motion amount of the traced object of the motion map and classify the same as the foreground area. In another embodiment, the electronic device 101 may generate the tri map further using the photo diode data based on the motion map. The electronic device 101 may perform object segmentation additionally based on at least one of color information and phase information based on the generated tri map and perform application of an image effect using the result of segmentation. When no facial area is detected, the electronic device 101 may terminate the operation or apply other image effect in operation 1199.

Figure 12:
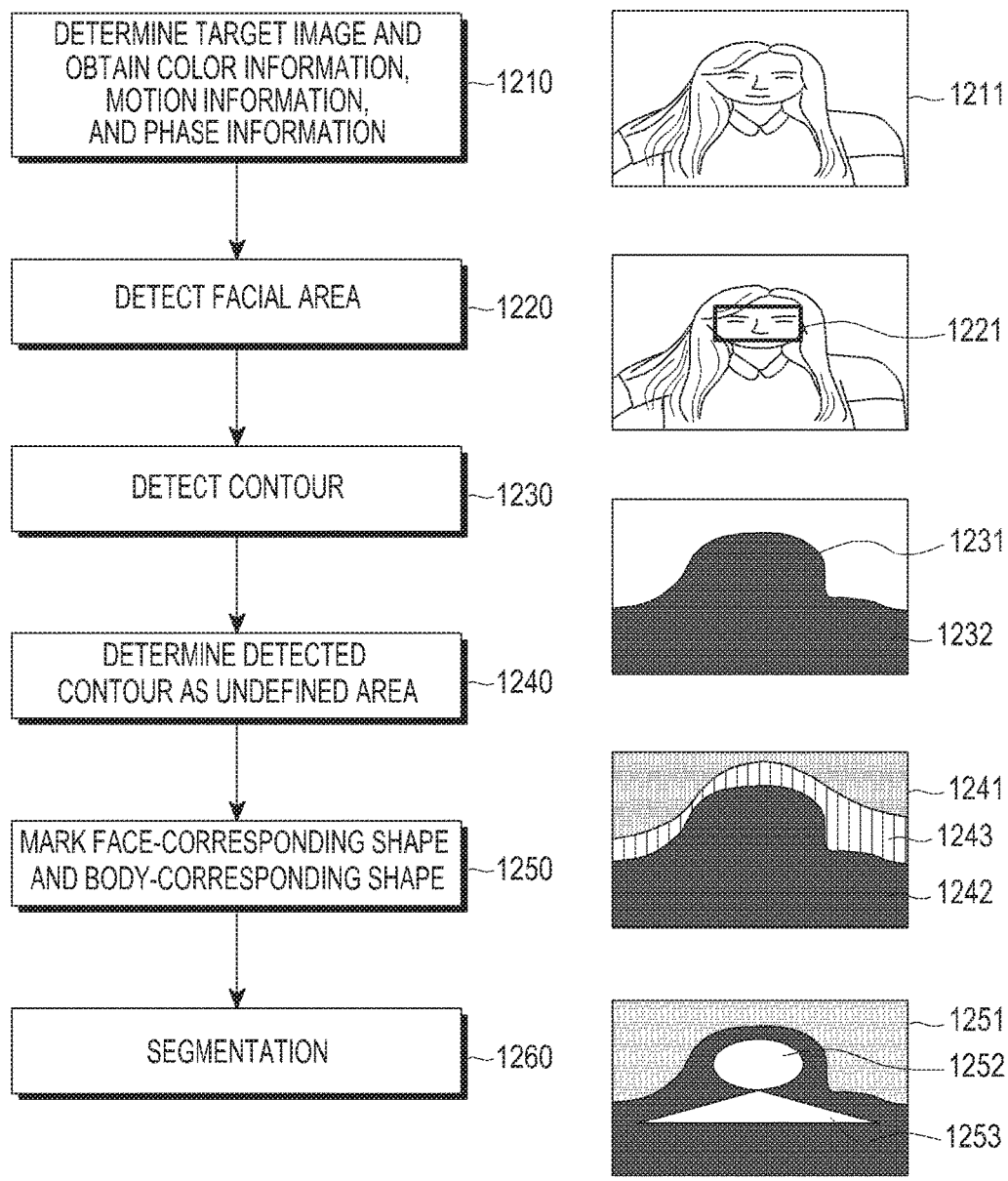
FIG. 12 is a flowchart illustrating a method for controlling an electronic device according to an embodiment of the present disclosure.

FIG. 12 is a flowchart illustrating a method for controlling an electronic device according to an embodiment of the present disclosure.

Referring to FIG. 12, in operation 1210, the electronic device 101 may determine a target image 1211 and obtain color information, motion amount, and phase information of the target image 1211. Although not shown, the electronic device 101 may select a comparison image and obtain the motion amount of each of at least one object in the target image according to the result of comparison between target image and comparison image. Further, the electronic device 101 may obtain color information of the target image 1211. When the electronic device 101 includes a phase pixel such as a 2PD system, the electronic device 101 may obtain phase information.

In operation 1220, the electronic device 101 may detect a facial area 1221 from the target image 1211. The electronic device 101 may select the facial area 1221 as the traced object and detect the same. The electronic device 101 may previously store a face detection algorithm and use the same to detect the facial area 1221. The electronic device 101 may detect the facial area 1221 based on the color information of the target image 1211.

In operation 1230, the electronic device 101 may detect the contour 1231 of the figure area 1232. The electronic device 101 may obtain the motion amount of the facial area 1221. The electronic device 101 may detect the figure area 1232 based on the motion amount of the facial area 1221 and may thus detect the contour 1231. As set forth above, the electronic device 101 may classify the area having substantially the same motion amount as the facial area 1221 or a motion amount less than the threshold, together with the facial area 1221, as the figure area 1232. The electronic device 101 may detect the boundary of the figure area 1232 as the contour 1231 or may determine an area including the boundary as the contour 1231. According to an embodiment of the present disclosure, the electronic device 101 may detect the contour 1231 of the figure area 1232 further using at least one of color information and phase information in addition to the motion amount. In operation 1240, the electronic device 101 may determine the detected contour 1231 as the undefined area 1243. The electronic device 101 may determine the background area 1241 and the foreground area 1242.

In operation 1250, the electronic device 101 may mark the face corresponding shape 1252 and body corresponding shape 1253 and classify the same as the figure area. The electronic device 101 may perform marking on the background area 1251 as well. In operation 1260, the electronic device 101 may perform object segmentation and apply an image effect using the result of segmentation. The electronic device 101 may perform segmentation on the undefined area 1243 and may thus reclassify the pixel of the undefined area 1243 as one of the figure area or background area. The electronic device 101 may perform object segmentation based on at least one of color information and phase information for the undefined area 1243. As reclassifying the pixel of the undefined area 1243 as one of the figure area or background area, the electronic device 101 may output the image having the figure area and background area alone separated.

Figure 13:
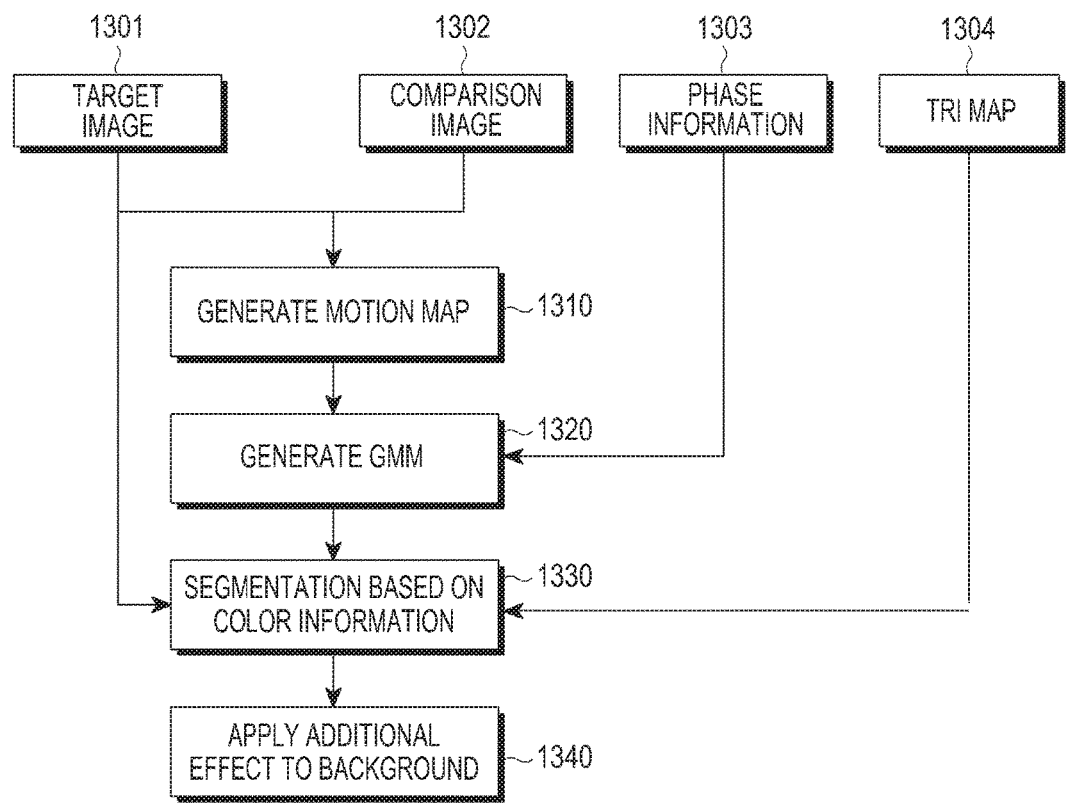
FIG. 13 is a flowchart illustrating a method for controlling an electronic device according to an embodiment of the present disclosure.

FIG. 13 is a flowchart illustrating a method for controlling an electronic device according to an embodiment of the present disclosure.

Referring to FIG. 13, in operation 1310, the electronic device 101 may generate a motion map using the target image 1301 and the comparison image 1302. The electronic device 101 may detect a traced object in the target image 1301 and detect a traced object in the comparison image 1302. The traced objects may be objects for the same subject. The electronic device 101 may detect the motion amount for at least one traced object to thereby generate a motion map. According to an embodiment of the present disclosure, the motion map may be colored to differentiate at least one of the size and direction of motion. The electronic device 101 may generate a tri map 1304 based on the motion map. Further, the electronic device 101 may determine an initial foreground area and an initial background area based on the motion map. The electronic device 101 may determine the initial foreground area and the initial background area using at least one of color information and phase information in addition to the motion map. Further, the electronic device 101 may determine the rest not classified as the initial foreground area and initial background area as the undefined area and generate a tri map 1304.

In operation 1320, the electronic device 101 may generate a Gaussian mixture model (GMM) for the initial foreground area and initial background area. The probability that a pixel belongs to the given model may be as shown in Equation 1.

$$P(x|\theta)=\Sigma_{i=1}^{k}w_{i}G(\mu_{i},\sigma_{i})\qquad\text{Equation 1}$$

In Equation 1, x is the variable related to the face to be detected, and θ is the mathematical model for representing the front view/back view. Further, i is the index for representing an ith Gaussian, wi may be the weight, μi is the mean value, and σi may be the standard deviation.

The electronic device 101 may generate the GMM for each of the background area and the foreground area, and in operation 1330, the electronic device 101 may perform segmentation based on each weight calculated from each GMM. The electronic device 101 may generate the GMM for the phase information 1303 as well as the color information and may use the same to perform segmentation. According to an embodiment of the present disclosure, the electronic device 101 may conduct energy segmentation framework segmentation, e.g., graph cut. The energy segmentation framework may classify pixels with the foreground area and background area, and pixels classified from the tri map may operate as data components. Meanwhile, the weight of the edge between pixels may correspond to the pixel similarity. For a relatively large difference in pixel color, the edge may have a relatively low weight, and this may be used as a smoothness component for minimization. For the undefined pixel, the electronic device 101 may calculate the pixel edge connected to the source and sink node dependent upon the probability of pixel in the foreground area and background area. The minimization function may minimize the cost function with the separative source node and sink node for the image. The cost function may be total sum of weights of the edges as cut. After cutting, the pixel connected to the source node may be classified as the foreground, and the pixel connected to the sink node may be classified as background.

In operation 1340, the electronic device 101 may apply an additional effect to the segmented background. For example, the electronic device 101 may apply a blurring effect to the background. Accordingly, the electronic device 101 may output the image having the background blurred.

Figure 14:
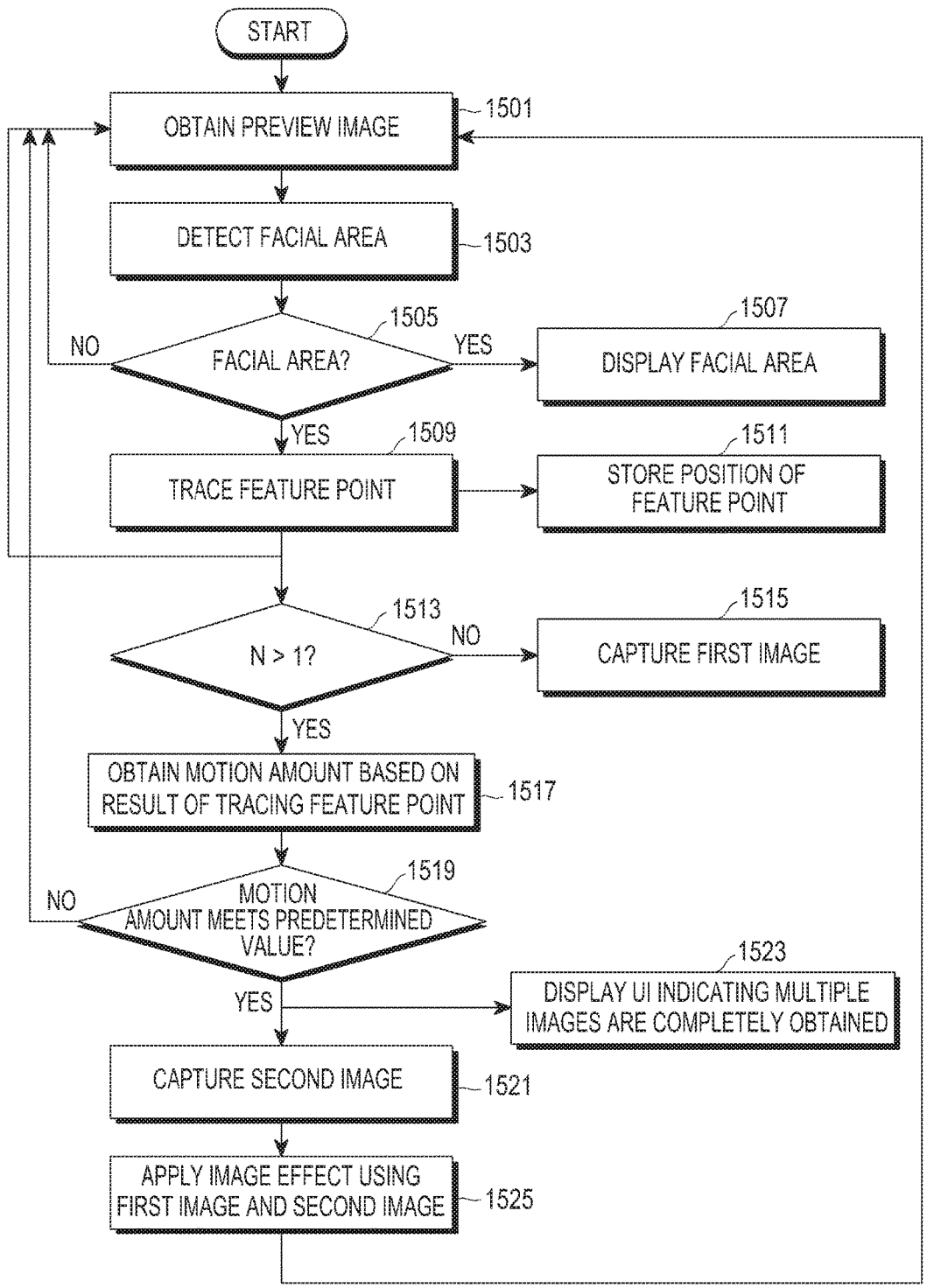
FIG. 14 is a flowchart illustrating a method for controlling an electronic device according to an embodiment of the present disclosure.

FIG. 14 is a flowchart illustrating a method for controlling an electronic device according to an embodiment of the present disclosure.

Referring to FIG. 14, in operation 1501, the electronic device 101 may obtain a preview image. For example, the electronic device 101 may capture an image of the user in a selfie mode. The electronic device 101 may obtain a plurality of preview images, and the plurality preview images may be images obtained by capturing the user at different capturing positions.

In operation 1503, the electronic device 101 may detect the facial area from the target image. The electronic device 101 may detect the facial area from the target image based on a pre-stored face recognition algorithm.

In operation 1505, the electronic device 101 may determine whether the target image has a facial area. Upon determining that no facial area is included in the target image, the electronic device 101 may capture other preview image. When determining that the target image has a facial area, the electronic device 101 may display the facial area in operation 1507. For example, the electronic device 101 may display an additional object able to indicate the facial area on the preview image. Further, in operation 1509, the electronic device 101 may trace feature points for the facial area. In operation 1511, the electronic device 101 may store the positions of the feature points.

The electronic device 101, when the number N of the obtained preview images is 1 in operation 1513, may capture the preview image as a first image and store the first image in operation 1515. Meanwhile, when the number N of the obtained preview images exceeds 1, the electronic device 101 may obtain the motion amount of the feature points, i.e., the motion amount of the facial area, based on the result of tracing the feature points in operation 1517.

In operation 1519, the electronic device 101 may determine whether the magnitude of motion exceeds a threshold. When the magnitude of motion is the threshold or less, the electronic device 101 may obtain other preview image. When the magnitude of motion exceeds the threshold, the electronic device 101 may capture and store the second image in operation 1521. The electronic device 101 may store the motion amount together. In operation 1523, the electronic device 101 may also display a UI indicating that the plurality of images have been completely obtained. In operation 1525, the electronic device 101 may perform object segmentation using the first and second images. The electronic device 101 may perform object segmentation for the first image and second image based on the motion amount.

Figure 15:
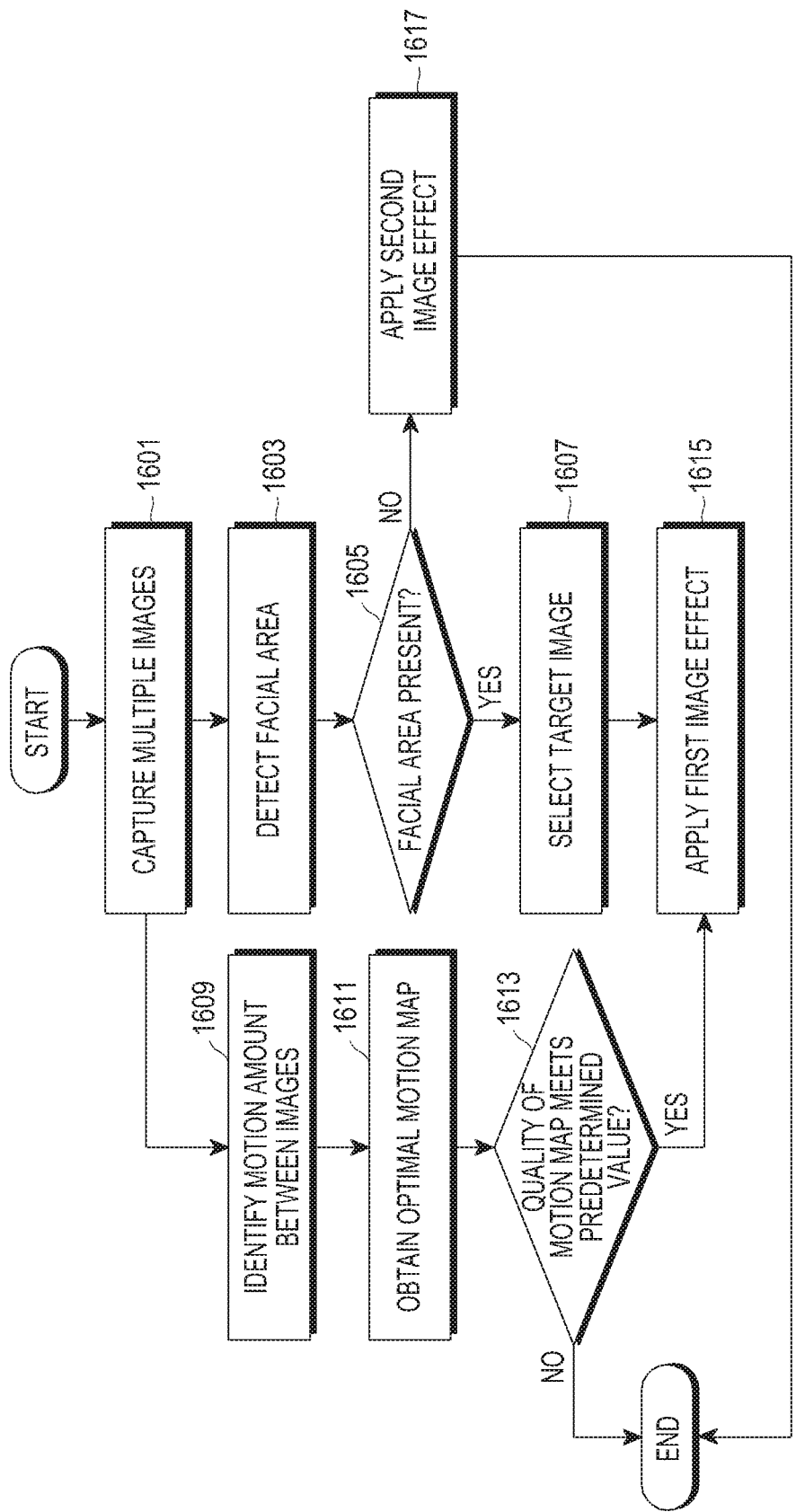
FIG. 15 is a flowchart illustrating a method for controlling an electronic device according to an embodiment of the present disclosure.

FIG. 15 is a flowchart illustrating a method for controlling an electronic device according to an embodiment of the present disclosure.

Referring to FIG. 15, in operation 1601, the electronic device 101 may capture a plurality of images. The electronic device 101 may capture and store a plurality of images at different capturing positions. In operation 1603, the electronic device 101 may detect the facial area from one of the plurality of images. When it is determined that there is a facial area in operation 1605, the electronic device 101 may select it as the target image in operation 1607 and applies a first image effect at operation 1615. When it is determined that there is not a facial area in operation 1605, the electronic device 101 applies a second image effect at operation 1617. In operation 1609, the electronic device 101 may detect the motion amount between images. In operation 1611, the electronic device 101 may obtain the optimal motion map. The motion map may include at least one of motion size and motion direction and references for determining the quality of motion map may be previously configured. In operation 1613, the electronic device 101 may determine whether the quality of motion map meets a preset value and if so, applies a first image effect at operation 1615. When it is determined that the quality of motion map meets the preset value, the electronic device 101 may perform object segmentation on the target image based on the motion amount of the motion map.

Figure 16:
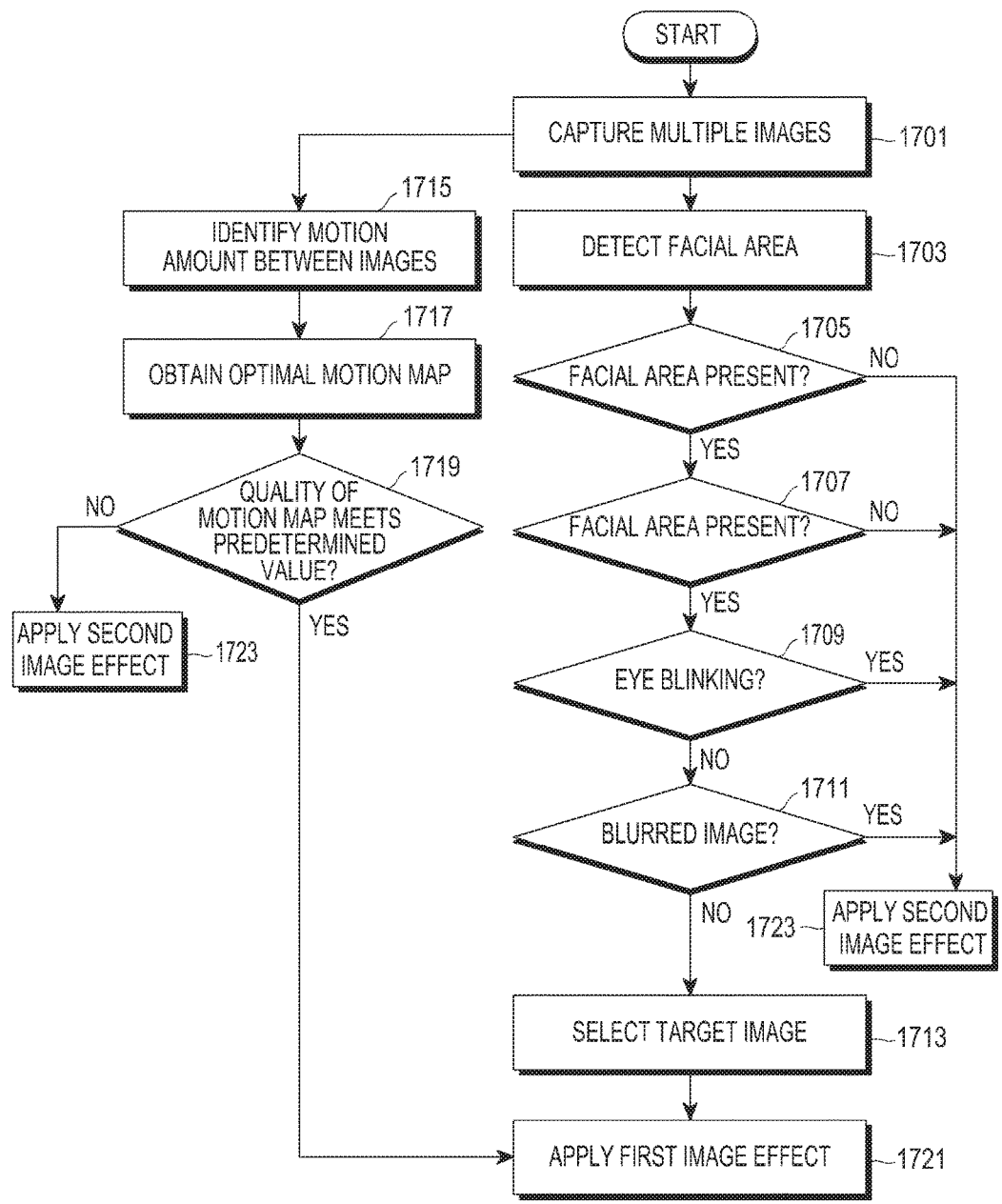
FIG. 16 is a flowchart illustrating a method for controlling an electronic device according to an embodiment of the present disclosure.

FIG. 16 is a flowchart illustrating a method for controlling an electronic device according to an embodiment of the present disclosure.

Referring to FIG. 16, operations 1701, 1703, and 1715 to 1719 have been described in detail above in connection with operations 1601, 1603, and 1609 to 1613 of FIG. 15, and thus, no further detailed description thereof is given. Also operations 1713, 1721, and 1723 have been described in detail above in connection with operations 1607, 1615, and 1617 of FIG. 15, and thus, no further detailed description thereof is given.

When it is determined in operation 1705 that there is a facial area, the electronic device 101 may determine whether the facial area of image is a smiling shape, eye is not blinking, and the image is not a blurred image in operations 1707, 1709, and 1711. When it is determined that the facial area of image is a smiling shape, the eye is not blinking, and the image is not a blurred image, the electronic device 101 may select the image as the target image.

Figure 17:
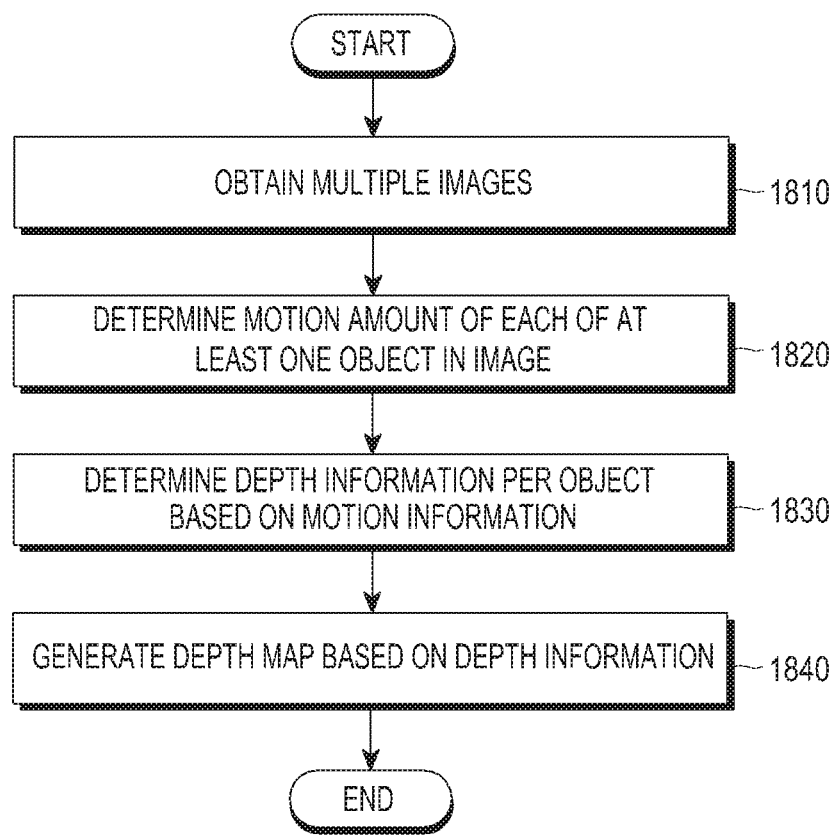
FIG. 17 is a flowchart illustrating a method for controlling an electronic device according to an embodiment of the present disclosure.

FIG. 17 is a flowchart illustrating a method for controlling an electronic device according to an embodiment of the present disclosure.

Referring to FIG. 17, in operation 1810, the electronic device 101 may obtain a plurality of images. Here, the plurality of images may be images captured at different capturing positions. As set forth above, the electronic device 101 may obtain a plurality of images with different capturing positions based on various changes in position due to, e.g., the user's hand tremble or the user's intended change in position of the electronic device 101.

In operation 1820, the electronic device 101 may determine the motion amount of each of at least one object in the image. As described above, the electronic device 101 may compare a plurality of images and determine the motion amount of each of at least one object in the image.

In operation 1830, the electronic device 101 may determine the per-object depth information based on the motion amount of each of at least one object. As described above, when the distance from the subject is relatively small, the motion of the object in the image as the capturing position varies may be relatively large, and when the distance from the subject is relatively large, even when the capturing position is varied, the motion of object in the image may be relatively small. Thus, the electronic device 101 may set a relatively large depth value for an object having a relatively small motion amount and a relative small depth value for an object having a relatively large motion amount.

In operation 1840, the electronic device 101 may generate a depth map based on the depth value of each object. The depth map may be a map including the depth value of each object. The electronic device 101 may reconfigure the 3D image based on the depth map and display the same.

Figure 18:
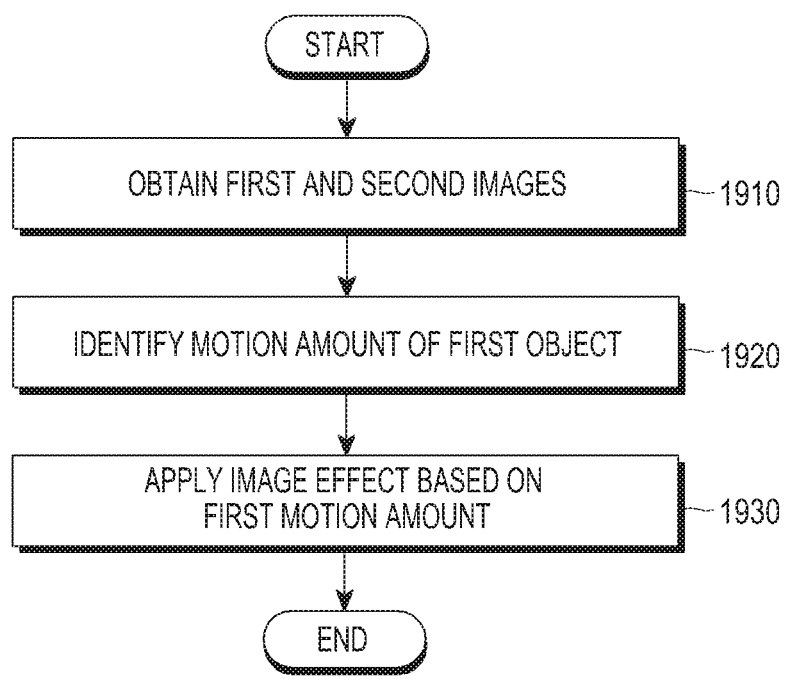
FIG. 18 is a flowchart illustrating a method for controlling an electronic device according to an embodiment of the present disclosure.

FIG. 18 is a flowchart illustrating a method for controlling an electronic device according to an embodiment of the present disclosure.

Referring to FIG. 18, in operation 1910, the electronic device 101 may capture and obtain a scene including one object. The electronic device 101 may obtain a first image and a second image for the object.

In operation 1920, the electronic device 101 may identify the motion amount corresponding to the object by comparing the first image with the second image. The electronic device 101 may identify whether the identified motion amount meets a designated value.

In operation 1930, the electronic device 101 may apply a designated effect to the image area corresponding to the object, at least, based on the result of identification. For example, the electronic device 101 may apply an image effect based on the motion amount. Specifically, when the motion amount meets the predesignated value, the electronic device 101 may perform object segmentation and may perform image blurring, such as blurring, using the result of segmentation.

As set forth above, image processing may be performed through image analysis including one object.

Figure 19:
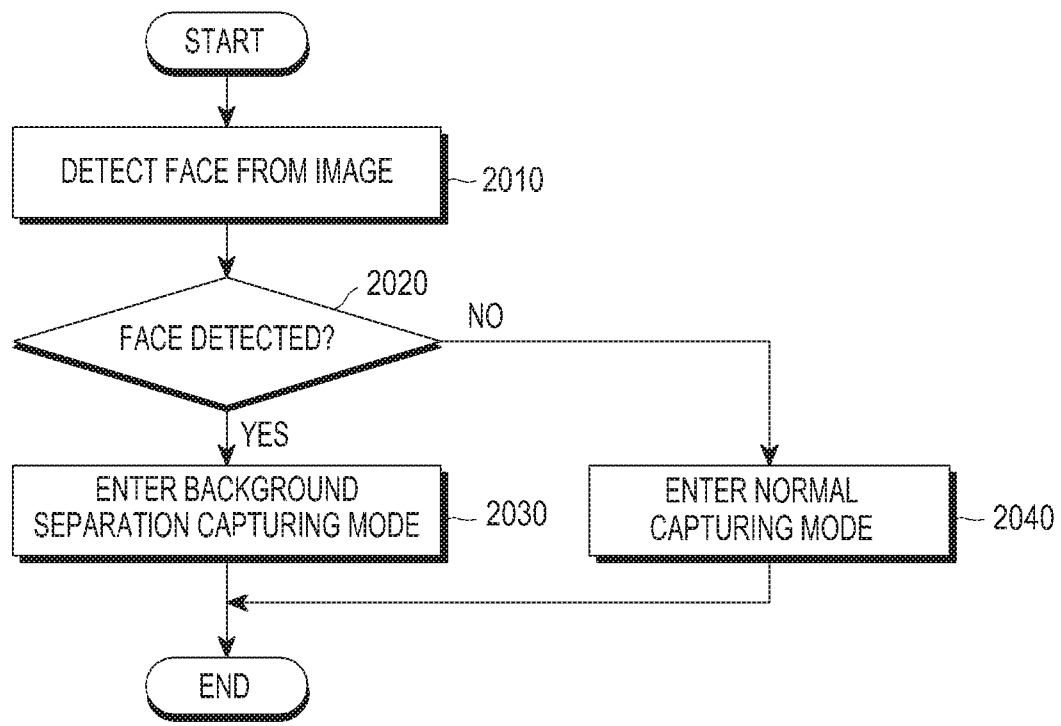
FIG. 19 is a flowchart illustrating a method for controlling an electronic device according to an embodiment of the present disclosure.

FIG. 19 is a flowchart illustrating a method for controlling an electronic device according to an embodiment of the present disclosure.

Referring to FIG. 19, in operation 2010, the electronic device 101 may detect a face from an image. In operation 2020, the electronic device 101 may determine whether the face is detected from the image. When the face is detected, the electronic device 101 may enter into a background separation capturing mode at which the face is separated from the background through the above process in operation 2030. Unless the face is detected, the electronic device 101 may enter into a normal capturing mode in operation 2040.

When the face detection succeeds and the number of detected faces is a predetermined number (e.g., five) or more or the area occupied by the face(s) is not less than a predetermined ratio relative to the whole image, the electronic device 101 might not use the background separation capturing mode for the scene, and accordingly, the amount of calculation may decrease.

According to an embodiment of the present disclosure, a method for controlling an electronic device may obtain a first image and a second image for the scene including a first object and a second object, identify a first motion amount corresponding to the first object and a second motion amount corresponding to the second object using the first image and the second image, and apply different effects to a first image area corresponding to the first object and a second image area corresponding to the second object, at least, based on the first motion amount and the second motion amount.

According to an embodiment of the present disclosure, the first motion amount may correspond to a difference between a position of the first object in the first image and a position of the first object in the second image, and the second motion amount may correspond to a difference between a position of the second object in the first image and a position of the second object in the second image.

According to an embodiment of the present disclosure, the method for controlling an electronic device may select, as the first image and the second image, a pair of images having a difference in motion amount not less than a predetermined value from among a plurality of preview images for the scene.

According to an embodiment of the present disclosure, the method for controlling the electronic device may compare the first image with the second image and obtain at least one of the first motion amount or the second motion amount based on a result of the comparison.

According to an embodiment of the present disclosure, the method for controlling the electronic device may compare the first image with the second image, determine whether a difference between the first motion amount and the second motion amount meets a predetermined value, and determine the first image area and the second image area based on the determination.

According to an embodiment of the present disclosure, the method for controlling the electronic device may separate the first object from the second object in the first image based on the first motion amount and the second motion amount. The first image area may correspond to a first depth for the scene, and the second image area correspond to a second depth for the scene.

According to an embodiment of the present disclosure, a method for controlling an electronic device may classify the first image area based on predetermined color information, determine a difference between the first motion amount and a motion amount of an area to be classified around the first image area, when the difference meets a predetermined value, determine the area to be classified as a portion of the corresponding first image area, and when the difference does not meet the predetermined value, determine the area to be classified as not belonging to the first image area.

According to an embodiment of the present disclosure, the first object may include a figure, and the second object may include a background. The method for controlling the electronic device blur the background and output an image including the figure and the blurred background as an image corresponding to the scene.

The first image may be obtained as the electronic device performs capturing at a first position, and the second image may be obtained as the electronic device performs capturing at a second position. The first motion amount and the second motion amount may be generated by a difference in position between the first position and the second position.

According to an embodiment of the present disclosure, the method for controlling the electronic device may assign a first depth value to the first object and a second depth value to the second object based on the first motion amount and the second motion amount.

According to an embodiment of the present disclosure, a method for controlling an electronic device may obtain a plurality of images for the scene, identify whether a motion amount corresponding to the object in the plurality of images meets a predetermined value, and apply a predetermined effect to an image area corresponding to the object, at least, based on a result of the identification. The motion amount may correspond to a difference between a position of the object in a first image of the plurality of images and a position of the object in a second image of the plurality of images.

According to an embodiment of the present disclosure, the method for controlling an electronic device may select, as the first image and the second image, a pair of images having a difference in motion amount not less than a predetermined value from among a plurality of preview images for the scene. The first image area may correspond to a first depth for the scene, and the second image area correspond to a second depth for the scene.

According to an embodiment of the present disclosure, the object may include a figure. The method for controlling the electronic device may blur a background other than the figure and output an image including the figure and the blurred background as an image corresponding to the scene.

Each of the plurality of images may be obtained as the electronic device performs capturing at a different position.

According to an embodiment of the present disclosure, a method for controlling an electronic device may comprise obtaining a first image and a second image, comparing the first image with the second image to identify a motion amount of each of at least one object of the first image, obtaining depth information on each of the at least one object based on the motion amount of each of the at least one object, and generating a depth map for the first image based on the obtained depth information. Each of the first image and the second image may be obtained as the electronic device performs capturing at a different position.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

According to an embodiment of the present disclosure, there is provided a storage medium storing instructions executed by at least one processor to enable the processor to obtain a first image and a second image for the scene including a first object and a second object, identify a first motion amount corresponding to the first object and a second motion amount corresponding to the second object using the first image and the second image, and apply different effects to a first image area corresponding to the first object and a second image area corresponding to the second object, at least, based on the first motion amount and the second motion amount.

While the present disclosure has been shown and described with reference to various embodiments thereof, it will be understood by those skilled in the art that various changes in form and details may be made therein without departing from the spirit and the scope of the present disclosure as defined by the appended claims and their equivalents.

What is claimed is:

1. An electronic device comprising:
    a camera module configured to capture a scene; and
    an image processing module operatively connected with the camera module, the image processing module configured to:
        obtain a first image and a second image for the scene including a first object and a second object,
        identify a first motion amount corresponding to the first object and a second motion amount corresponding to the second object, which has a difference of more than a predetermined value from the first motion amount, using the first image and the second image, and
        apply, based on the first motion amount and the second motion amount, a first effect to a first image area corresponding to the first object and a second effect to a second image area corresponding to the second object, the first effect applied to the first image area being different from the second effect applied to the second image area.

2. The electronic device of claim 1,
    wherein the first motion amount corresponds to a difference between a position of the first object in the first image and a position of the first object in the second image, and
    wherein the second motion amount corresponds to a difference between a position of the second object in the first image and a position of the second object in the second image.

3. The electronic device of claim 1, wherein the image processing module is further configured to select, as the first image and the second image, a pair of images having a difference in motion amount not less than the predetermined value from among a plurality of preview images for the scene.

4. The electronic device of claim 1, wherein the image processing module is further configured to:
    compare the first image with the second image, and
    obtain at least one of the first motion amount or the second motion amount based on a result of the comparison.

5. The electronic device of claim 1, wherein the image processing module is further configured to:
    compare the first image with the second image,
    determine whether a difference between the first motion amount and the second motion amount meets the predetermined value, and
    determine the first image area and the second image area based on the determination.

6. The electronic device of claim 5, wherein the image processing module is further configured to separate the first object from the second object in the first image based on the first motion amount and the second motion amount.

7. The electronic device of claim 1,
    wherein the first image area corresponds to a first depth for the scene, and
    wherein the second image area corresponds to a second depth for the scene.

8. The electronic device of claim 1, wherein the image processing module is further configured to:
    classify the first image area based on predetermined color information,
    determine a difference between the first motion amount and a motion amount of an area to be classified around the first image area,
    determine, when the difference meets the predetermined value, the area to be classified as a portion of the corresponding first image area, and
    determine, when the difference does not meet the predetermined value, the area to be classified as not belonging to the first image area.

9. The electronic device of claim 1,
wherein the first object includes a figure, and the second object includes a background, and
wherein the image processing module blurs the background and outputs an image including the figure and the blurred background as an image corresponding to the scene.

10. The electronic device of claim 1,
wherein the first image is obtained as the electronic device performs capturing at a first position, and
wherein the second image is obtained as the electronic device performs capturing at a second position.

11. The electronic device of claim 10, wherein the first motion amount and the second motion amount are generated by a difference in position between the first position and the second position.

12. The electronic device of claim 1, wherein the image processing module is further configured to assign a first depth value to the first object and a second depth value to the second object based on the first motion amount and the second motion amount.

13. A method for controlling an electronic device, the method comprising:
obtaining a first image and a second image for the scene including a first object and a second object;
identifying a first motion amount corresponding to the first object and a second motion amount corresponding to the second object, which has a difference of more than a predetermined value from the first motion amount, using the first image and the second image; and
applying, based on the first motion amount and the second motion amount, a first effect to a first image area corresponding to the first object and a second effect a second image area corresponding to the second object, the first effect applied to the first image area being different from the second effect applied to the second image area.

14. The method of claim 13,
wherein the first motion amount corresponds to a difference between a position of the first object in the first image and a position of the first object in the second image, and
wherein the second motion amount corresponds to a difference between a position of the second object in the first image and a position of the second object in the second image.

15. The method of claim 13, further comprising selecting, as the first image and the second image, a pair of images having a difference in motion amount not less than the predetermined value from among a plurality of preview images for the scene.

16. The method of claim 13, wherein the first image area corresponds to a first depth for the scene, and the second image area corresponds to a second depth for the scene.

17. The method of claim 13,
wherein the first object includes a figure, and the second object includes a background,
the method further comprising blurring a background other than the figure, and outputting an image including the figure and the blurred background as an image corresponding to the scene.

18. The method of claim 13,
wherein the first image is obtained as the electronic device performs capturing at a first position, and
wherein the second image is obtained as the electronic device performs capturing at a second position.

19. A method for controlling an electronic device, the method comprising:
obtaining a first image with respect to a first scene comprising a first subject at a first position and a second image with respect to a second scene comprising the first subject at a second position different from the first position;
comparing the first image with the second image to identify a motion amount of each of at least one object of the first image;
obtaining depth information on each of the at least one object based on the motion amount of each of the at least one object;
generating a depth map for the first image based on the obtained depth information; and
applying, based on the depth map, different effects to each of the at least one object in the first image.

* * * * *